(12) United States Patent
Jun et al.

(10) Patent No.: US 10,908,719 B2
(45) Date of Patent: Feb. 2, 2021

(54) TOUCH DISPLAY DEVICE, TOUCH DRIVING CIRCUIT, AND TOUCH DRIVING METHOD

(71) Applicant: LG Display Co., Ltd., Seoul (KR)

(72) Inventors: Jaehun Jun, Seoul (KR); Hyunkyu Park, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/195,725

(22) Filed: Nov. 19, 2018

(65) Prior Publication Data

US 2019/0204944 A1 Jul. 4, 2019

(30) Foreign Application Priority Data

Dec. 29, 2017 (KR) ........................ 10-2017-0184139

(51) Int. Cl.
  *G06F 3/041* (2006.01)
  *G06F 3/044* (2006.01)
(52) U.S. Cl.
  CPC .......... *G06F 3/0412* (2013.01); *G06F 3/0443* (2019.05); *G06F 3/04166* (2019.05)
(58) Field of Classification Search
  CPC ... G06F 3/0412; G06F 3/0443; G06F 3/04166
  See application file for complete search history.

(56) References Cited

U.S. PATENT DOCUMENTS

| | | | | |
|---|---|---|---|---|
| 8,363,034 | B2 * | 1/2013 | Tanimizu | G06F 3/0416 178/18.06 |
| 9,223,425 | B1 * | 12/2015 | Kim | G06F 3/0412 |
| 9,342,177 | B2 | 5/2016 | Seo et al. | |
| 9,348,476 | B2 * | 5/2016 | Lee | G06F 3/044 |
| 9,377,915 | B2 * | 6/2016 | Park | G06F 3/044 |
| 9,442,615 | B2 * | 9/2016 | Reynolds | G06F 3/04184 |
| 9,513,749 | B2 * | 12/2016 | Suzuki | G06F 3/044 |
| 9,665,218 | B2 * | 5/2017 | Huang | G06F 3/044 |
| 9,690,437 | B2 * | 6/2017 | Shin | G06F 3/044 |
| 9,696,883 | B2 * | 7/2017 | Oh | G06F 3/0416 |

(Continued)

FOREIGN PATENT DOCUMENTS

EP 3232303 A1 10/2017
JP 2013-020479 A 1/2013

(Continued)

OTHER PUBLICATIONS

Office Action, Japanese Patent Application No. 2018-240546, dated Jan. 17, 2020, 8 pages.

*Primary Examiner* — Michael J Jansen, II
(74) *Attorney, Agent, or Firm* — Fenwick & West LLP

(57) ABSTRACT

Disclosed are a touch display device, a touch driving circuit, and a touch driving method. A touch display device, a touch driving circuit, and a touch driving method is capable of supplying touch driving signals having different signal characteristics (e.g., driving frequencies) to touch electrodes or sensing groups by considering such touch electrode-specific or sensing group-specific difference. By this configuration, without reducing touch sensitivity, the touch sensing time required to sense all of the touch electrodes can be reduced, and a display driving time can be significantly lengthened, making it possible to implement a display requiring a large screen and high-resolution.

11 Claims, 24 Drawing Sheets

(56) References Cited

U.S. PATENT DOCUMENTS

| | | | |
|---|---|---|---|
| 9,740,351 B2 | 8/2017 | Li et al. | |
| 9,791,982 B2* | 10/2017 | Park | G06F 3/044 |
| 9,886,129 B2* | 2/2018 | Kim | G06F 3/0418 |
| 9,971,451 B2* | 5/2018 | Kim | G06F 3/0418 |
| 9,971,463 B2* | 5/2018 | Shepelev | G06F 3/0418 |
| 10,042,470 B2* | 8/2018 | Shin | G06F 3/0412 |
| 10,074,338 B2* | 9/2018 | Lee | G09G 5/006 |
| 10,101,836 B2* | 10/2018 | Wang | G02F 1/13338 |
| 10,133,376 B2* | 11/2018 | Kim | G06F 3/0412 |
| 10,133,435 B2* | 11/2018 | Bohannon | G06F 3/0416 |
| 10,146,359 B2* | 12/2018 | Tang | G09G 3/3655 |
| 10,185,434 B2* | 1/2019 | Suzuki | G06F 3/044 |
| 10,261,628 B2* | 4/2019 | Kim | G06F 3/0418 |
| 10,572,055 B2* | 2/2020 | Shin | G06F 3/0418 |
| 10,761,633 B2* | 9/2020 | Kang | G06F 3/0443 |
| 2011/0254805 A1* | 10/2011 | Tanimizu | G06F 3/0416 345/174 |
| 2014/0253498 A1* | 9/2014 | Suzuki | G06F 3/044 345/174 |
| 2014/0320450 A1* | 10/2014 | Lee | G06F 3/0418 345/174 |
| 2015/0009174 A1* | 1/2015 | Huang | G06F 3/044 345/174 |
| 2015/0084912 A1 | 3/2015 | Seo et al. | |
| 2015/0084922 A1* | 3/2015 | Park | G06F 3/044 345/174 |
| 2015/0091864 A1* | 4/2015 | Reynolds | G06F 3/0443 345/174 |
| 2015/0116267 A1* | 4/2015 | Inoue | G06F 3/044 345/174 |
| 2015/0179132 A1* | 6/2015 | Lee | G09G 5/006 345/174 |
| 2015/0179133 A1* | 6/2015 | Lee | G06F 3/044 345/174 |
| 2015/0309661 A1* | 10/2015 | Kim | G06F 3/0418 345/174 |
| 2016/0103518 A1* | 4/2016 | Yang | G06F 3/0412 345/173 |
| 2016/0188142 A1* | 6/2016 | Oh | G06F 1/3287 345/174 |
| 2016/0291746 A1* | 10/2016 | Kim | G06F 3/0412 |
| 2016/0320898 A1* | 11/2016 | Tang | G09G 3/3655 |
| 2016/0334902 A1 | 11/2016 | Li et al. | |
| 2016/0357342 A1* | 12/2016 | Olley | G06F 3/044 |
| 2017/0031487 A1* | 2/2017 | Wang | G02F 1/13338 |
| 2017/0045997 A1* | 2/2017 | Suzuki | G06F 3/044 |
| 2017/0060289 A1* | 3/2017 | Shin | G06F 3/044 |
| 2017/0090610 A1* | 3/2017 | Shepelev | G06F 3/03547 |
| 2017/0300165 A1* | 10/2017 | Shin | G06F 3/0416 |
| 2018/0004343 A1* | 1/2018 | Shin | G02F 1/13338 |
| 2018/0011598 A1* | 1/2018 | Ku | G06F 3/0418 |
| 2018/0059861 A1* | 3/2018 | Kim | G06F 3/0418 |
| 2018/0095597 A1* | 4/2018 | Kwon | G06F 3/0418 |
| 2018/0188845 A1* | 7/2018 | Bohannon | G06F 3/0416 |
| 2018/0232099 A1* | 8/2018 | Kim | G06F 3/0418 |
| 2018/0267639 A1* | 9/2018 | Han | G06F 3/041 |
| 2018/0364864 A9* | 12/2018 | Olley | G06F 3/044 |
| 2019/0204944 A1* | 7/2019 | Jun | G06F 3/041 |
| 2019/0204971 A1* | 7/2019 | Kang | G06F 3/03545 |

FOREIGN PATENT DOCUMENTS

| | | |
|---|---|---|
| JP | 2014-174851 A | 9/2014 |
| JP | 2015-064854 A | 4/2015 |
| JP | 2016-219003 A | 12/2016 |
| JP | 2017-076198 A | 4/2017 |
| KR | 10-2017-0077639 A | 7/2017 |

\* cited by examiner

TOUCH DISPLAY DEVICE, TOUCH DRIVING CIRCUIT, AND TOUCH DRIVING METHOD

CROSS REFERENCE TO RELATED APPLICATIONS

This application claims priority from Republic of Korea Patent Application No. 10-2017-0184139, filed on Dec. 29, 2017, which is hereby incorporated by reference in its entirety.

BACKGROUND

1. Field of Technology

The present disclosure relates to a touch display device, a touch driving circuit, and a touch driving method.

2. Description of the Prior Art

With the advancement of an information-oriented society, various requirements for display devices for displaying images have been increasing, and use has recently been made of various display devices, such as Liquid Crystal Display (LCD) devices, Plasma Display Panel (PDP) devices, and Organic Light-Emitting Display (OLED) devices.

Among such display devices, there is a touch display device which departs from a conventional input scheme using a button, a keyboard, or a mouse, and provides a touch-based input scheme which enables a user to easily, conveniently, and intuitively input information or a command.

For touch sensing, such a touch display device sequentially senses multiple touch electrodes, collects sensing results, and determines whether a touch is made, or calculates touch coordinates.

Such a touch display device needs to sequentially sense multiple touch electrodes, and thus requires quite a lot of time to complete touch sensing. However, due to the accuracy required for touch sensing, it is difficult to seek methods capable of reducing the time required for touch sensing.

SUMMARY

With this background, an aspect of the present disclosure is to provide a touch display device, a touch driving circuit, and a touch driving method which, without reducing touch sensitivity, can reduce the touch sensing time required to sense all touch electrodes.

Also, another aspect of the present disclosure is to provide a touch display device, a touch driving circuit, and a touch driving method which, without reducing touch sensitivity, can perform touch driving in a scheme capable of significantly lengthening a display driving time.

Also, still another aspect of the present disclosure is to provide a touch display device, a touch driving circuit, and a touch driving method which can perform touch driving in a scheme which can be applied to a display requiring a large screen and high resolution.

Also, yet another aspect of the present disclosure is to provide a touch display device, a touch driving circuit, and a touch driving method which can perform touch driving in such a manner as to cause touch driving signals to have different signal characteristics by considering the difference between time constants of touch electrodes or sensing groups (groups of touch electrodes capable of being simultaneously sensed).

Also, still yet another aspect of the present disclosure is to provide a touch display device, a touch driving circuit, and a touch driving method which can perform touch driving in such a manner as to cause touch driving signals to have different signal characteristics by considering the difference between signal delivery lengths of touch electrodes or sensing groups (groups of touch electrodes capable of being simultaneously sensed).

In addition, a further aspect of the present disclosure is to provide a touch display device, a touch driving circuit, and a touch driving method which can perform touch driving in such a manner as to cause touch driving signals to have different signal characteristics by considering the difference between positions of touch electrodes or sensing groups (groups of touch electrodes capable of being simultaneously sensed).

In accordance with an aspect of the present disclosure, there may be provided a touch display device including: a touch panel having multiple touch electrodes arranged therein; and a touch driving circuit configured to supply a touch driving signal to at least one of the multiple touch electrodes and receive a touch sensing signal according to the supply of the touch driving signal.

In the touch panel, the multiple touch electrodes may include a first touch electrode and a second touch electrode.

When a time constant of the second touch electrode is smaller than a time constant of the first touch electrode, a driving frequency of a touch driving signal supplied to the second touch electrode may be higher than a driving frequency of a touch driving signal supplied to the first touch electrode.

The touch panel may include: a first touch line configured to connect the touch driving circuit to the first touch electrode; and a second touch line configured to connect the touch driving circuit to the second touch electrode.

A time constant of the first touch electrode may correspond to an RC delay of the touch driving circuit, the first touch line, and the first touch electrode, and a time constant of the second touch electrode may correspond to an RC delay of the touch driving circuit, the second touch line, and the second touch electrode.

The second touch electrode may be located nearer to the touch driving circuit than the first touch electrode.

The touch driving signal of the second touch electrode may have a signal delivery length which is shorter than a signal delivery length of the touch driving signal of the first touch electrode.

The first touch electrode and the second touch electrode may both be connected to a first multiplexer included in the touch driving circuit.

The first touch electrode and the second touch electrode may be separately connected to a first multiplexer and a second multiplexer that are different and are included in the touch driving circuit.

When the touch driving signal is supplied to the second touch electrode connected to the second multiplexer, the touch driving signal may be supplied to a third touch electrode connected to the first multiplexer, and a driving frequency of the touch driving signal supplied to the third touch electrode may be identical to a driving frequency of the touch driving signal supplied to the second touch electrode.

When the touch driving signal is supplied to the first touch electrode connected to the first multiplexer, the touch driving signal may be supplied to a fourth touch electrode connected to the second multiplexer, and a driving frequency of the touch driving signal supplied to the fourth touch electrode may be identical to a driving frequency of the touch driving signal supplied to the first touch electrode.

The touch driving signal may be supplied to the first touch electrode during a first touch driving interval, the touch driving signal may be supplied to the second touch electrode during a second touch driving interval different from the first touch driving interval, and a time length of the second touch driving interval may be shorter than a time length of the first touch driving interval.

A first display driving interval may exist before the first touch driving interval, and a second display driving interval may exist between the first touch driving interval and the second touch driving interval.

A time length of the first display driving interval may be identical to a time length of the second display driving interval.

Alternatively, a time length of the second display driving interval may be longer than a time length of the first display driving interval.

A sum of the time length of the first touch driving interval and the time length of the first display driving interval may be identical to a sum of the time length of the second touch driving interval and the time length of the second display driving interval.

The touch display device may be a large display, such as a kiosk.

In accordance with another aspect of the present disclosure, there may be provided a touch display device including: a touch panel having multiple touch electrodes arranged therein; and a touch driving circuit configured to supply a touch driving signal to at least one of the multiple touch electrodes and receive a touch sensing signal according to the supply of the touch driving signal.

In the touch panel, the multiple touch electrodes may include a first touch electrode and a second touch electrode arranged at different positions.

In the touch panel, when the second touch electrode is located nearer to the touch driving circuit than the first touch electrode, a driving frequency of a touch driving signal supplied to the second touch electrode may be higher than a driving frequency of a touch driving signal supplied to the first touch electrode.

In accordance with still another aspect of the present disclosure, there may be provided a touch driving circuit for driving a touch panel having multiple touch electrodes arranged therein.

The touch driving circuit may include: a signal supplier configured to supply a touch driving signal to at least one of the multiple touch electrodes; and a signal receiver configured to receive a touch sensing signal according to supply of the touch driving signal.

The multiple touch electrodes may include a first touch electrode and a second touch electrode, and when a time constant of the second touch electrode is smaller than a time constant of the first touch electrode, a driving frequency of a touch driving signal supplied to the second touch electrode may be higher than a driving frequency of a touch driving signal supplied to the first touch electrode.

In accordance with yet another aspect of the present disclosure, there may be provided a touch driving method including: supplying a touch driving signal to at least one of the multiple touch electrodes; and upon supplying the touch driving signal, receiving a touch sensing signal.

The multiple touch electrodes may include a first touch electrode and a second touch electrode, and when a time constant of the second touch electrode is smaller than a time constant of the first touch electrode, a driving frequency of a touch driving signal supplied to the second touch electrode may be higher than a driving frequency of a touch driving signal supplied to the first touch electrode.

In accordance with still yet another aspect of the present disclosure, there may be provided a touch display device including: a touch panel having multiple touch electrodes arranged therein; and a touch driving circuit configured to supply a touch driving signal to at least one of the multiple touch electrodes and receive a touch sensing signal according to the supply of the touch driving signal.

In the touch panel, the multiple touch electrodes may include a first touch electrode and a second touch electrode.

When a time constant of the second touch electrode is smaller than a time constant of the first touch electrode, a touch driving signal supplied to the second touch electrode may have a signal characteristic different from that of a touch driving signal supplied to the first touch electrode.

In accordance with a further aspect of the present disclosure, there may be provided a touch display device including: a touch panel having multiple touch electrodes arranged therein; and a touch driving circuit configured to supply a touch driving signal to at least one of the multiple touch electrodes and receive a touch sensing signal according to the supply of the touch driving signal.

In the touch display device, the multiple touch electrodes may include a first touch electrode and a second touch electrode arranged at different positions.

The second touch electrode is disposed nearer to the touch driving circuit than the first touch electrode.

A first touch electrode sensing interval during which a touch driving signal is supplied to the first touch electrode may be different from a second touch electrode sensing interval during which a touch driving signal is supplied to the second touch electrode.

Hereinabove, the above-described embodiments of the present disclosure provide a touch display device, a touch driving circuit, and a touch driving method which, without reducing touch sensitivity, can reduce the touch sensing time required to sense all touch electrodes.

Also, the above-described embodiments of the present disclosure provide a touch display device, a touch driving circuit, and a touch driving method which, without reducing touch sensitivity, can perform touch driving in a scheme capable of significantly lengthening a display driving time.

Also, the above-described embodiments of the present disclosure provide a touch display device, a touch driving circuit, and a touch driving method which can perform touch driving in a scheme which can be applied to a display requiring a large screen and high resolution.

Also, the above-described embodiments of the present disclosure provide a touch display device, a touch driving circuit, and a touch driving method which can perform touch driving in such a manner as to cause touch driving signals to have different signal characteristics by considering the difference between time constants of touch electrodes or sensing groups (groups of touch electrodes capable of being simultaneously sensed).

Also, the above-described embodiments of the present disclosure provide a touch display device, a touch driving circuit, and a touch driving method which can perform touch driving in such a manner as to cause touch driving signals to have different signal characteristics by considering the difference between signal delivery lengths of touch electrodes or sensing groups (groups of touch electrodes capable of being simultaneously sensed).

Further, the above-described embodiments of the present disclosure provide a touch display device, a touch driving circuit, and a touch driving method which can perform touch driving in such a manner as to cause touch driving signals to have different signal characteristics by considering the difference between positions of touch electrodes or sensing groups (groups of touch electrodes capable of being simultaneously sensed).

BRIEF DESCRIPTION

The above and other aspects, features and advantages of the present disclosure will be more apparent from the following detailed description taken in conjunction with the accompanying drawings, in which.

DETAILED DESCRIPTION

Figure 1:
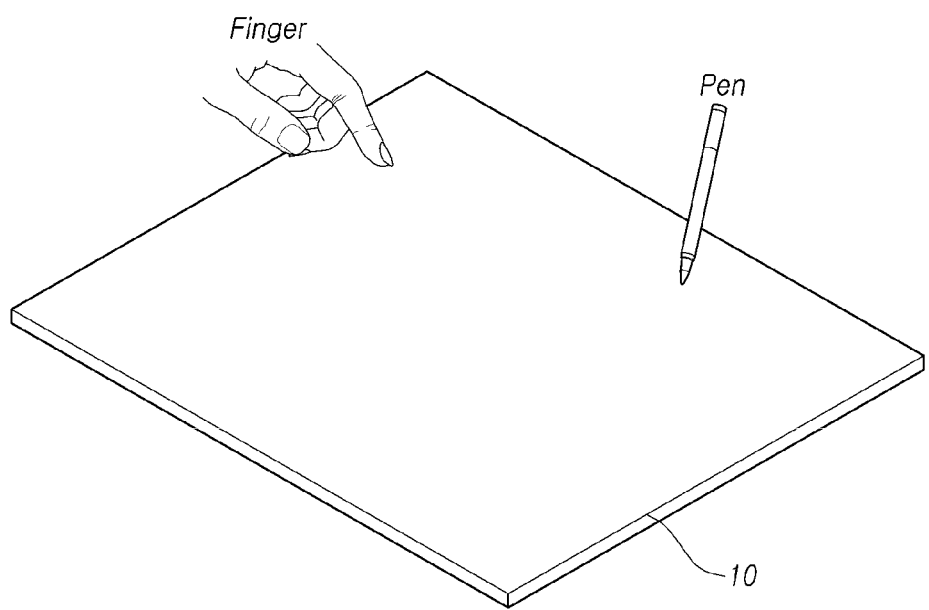
FIG. 1 is a view illustrating a touch display device according to embodiments of the present disclosure.

Hereinafter, exemplary embodiments of the present disclosure will be described in detail with reference to the accompanying drawings. In assigning reference numerals to elements in the drawings, the same reference numerals will designate the same elements where possible although they are shown in different drawings. Also, in the following description of the present disclosure, a detailed description of known functions and configurations incorporated herein will be omitted when it may make the subject matter of the present disclosure rather unclear.

In addition, such terms as "first", "second", "A", "B", "(a)", "(b)", and the like, may be used herein when describing elements of the present disclosure. These terms are merely used to distinguish one element from other elements, and the essence of a corresponding element, an order thereof, a sequence thereof, or the number of the corresponding elements are not limited by the terms. When an element is described as being "connected", "coupled", or "linked" to another element, it will be understood that the element may not only be directly connected or coupled to said another element, but may also be "connected", "coupled", or "linked" to said another element through a third element, or the third element may also be interposed between the element and said another element.

FIG. 1 is a view illustrating a touch display device 10 according to embodiments of the present disclosure.

The touch display device 10 according to embodiments of the present disclosure may not only provide an image display function of displaying an image, but may also provide a touch sensing function made by a touch means, such as a pen, as well as a touch sensing function made by a finger.

Examples of the pen may include: an active pen which is a touch means having a signal transmission/reception function, capable of operateing in conjunction with the touch display device 10, or including its own power source; a passive pen which is a touch means not having a signal transmission/reception function, its own power source, and the like; and the like.

In the present example, a touch means may signify not only a finger but also all objects capable of touching a screen in place of the finger, and may be referred to as a "touch object" or "touch pointer".

In the following description, a finger may be regarded as being representative of a passive touch means, such as a passive pen, and a pen may be regarded as being representative of an active touch means, such as an active pen. The pen may also be referred to as a "stylus", "stylus pen", "active stylus pen", or the like.

The touch display device 10 according to embodiments of the present disclosure may be, for example, a television (TV) or a monitor, or a mobile device, such as a tablet personal computer or a smart phone.

The touch display device 10 according to embodiments of the present disclosure may include a display part configured to provide an image display function, and a touch sensing part configured to sense a touch.

Figure 2:
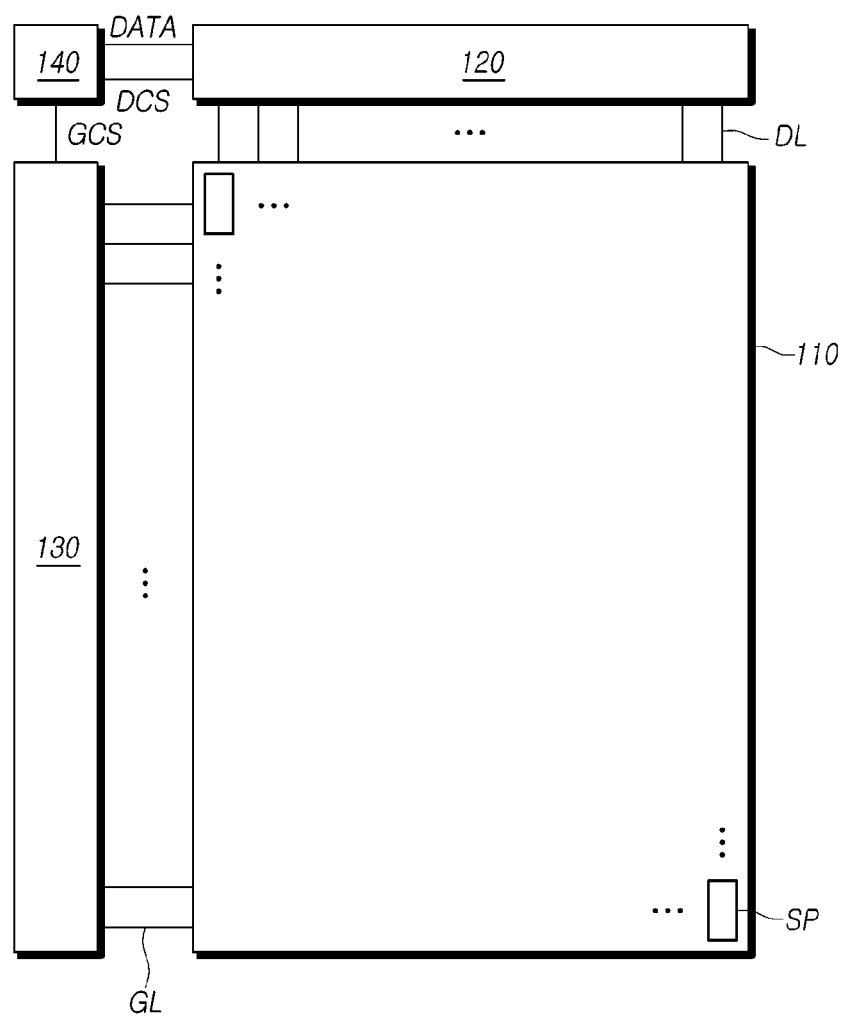
FIG. 2 is a view illustrating a display part of a touch display device according to embodiments of the present disclosure.
Figure 3:
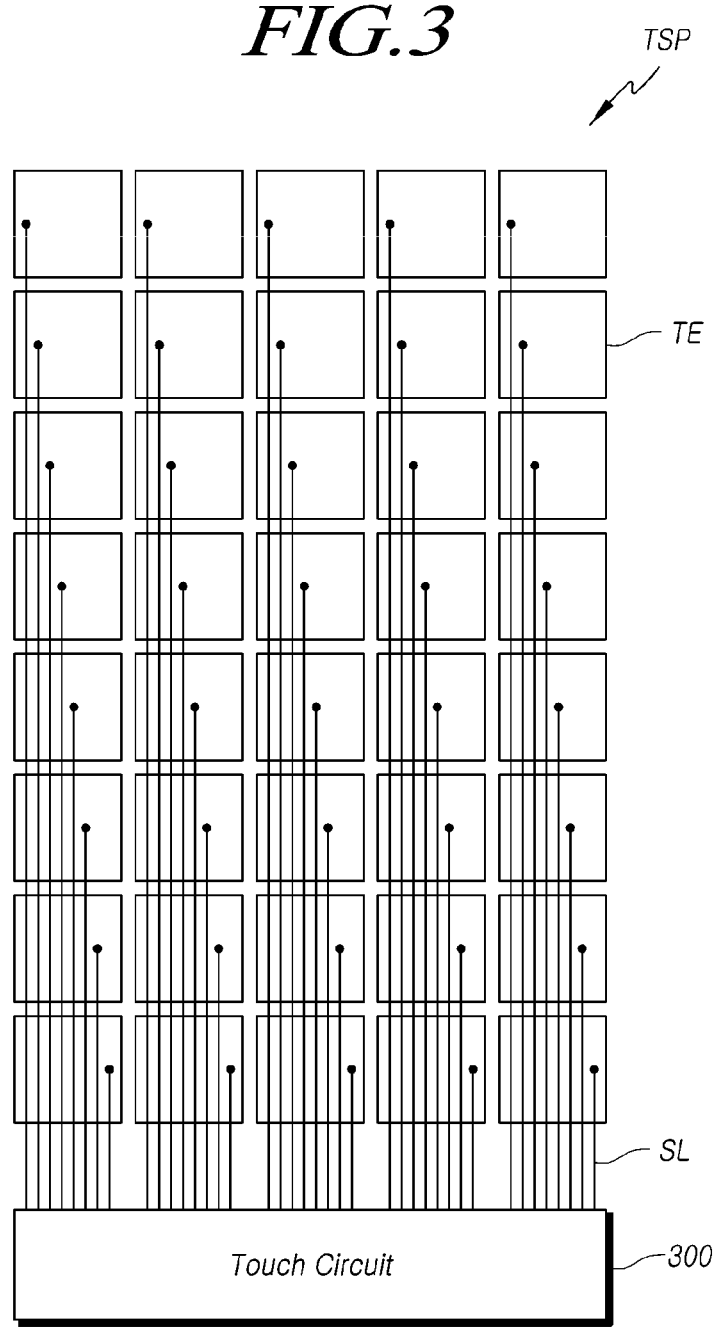
FIG. 3 is a view illustrating a touch sensing part of a touch display device according to embodiments of the present disclosure.

Referring to FIGS. 2 and 3, a structure of each of the display part and the touch sensing part of the touch display device 10 will be briefly described.

FIG. 2 is a view illustrating the display part of the touch display device 10 according to embodiments of the present disclosure.

Referring to FIG. 2, the display part of the touch display device 10 according to embodiments of the present disclosure may include a display panel 110, a data driving circuit 120, a gate driving circuit 130, a display controller 140, and the like.

The display panel 110 may have multiple data lines DL and multiple gate lines GL arranged therein, and may have multiple sub-pixels SP, which are defined (partitioned) by the multiple data lines DL and gate lines GL, arranged therein.

The data driving circuit 120 may supply a data voltage to each of the multiple data lines DL and may drive the multiple data lines DL.

The gate driving circuit 130 may sequentially supply a scan signal to the multiple gate lines GL and may drive the multiple gate lines GL.

The display controller 140 may respectively supply various control signals DCS and GCS to the data driving circuit 120 and the gate driving circuit 130 and may control an operation of each of the data driving circuit 120 and the gate driving circuit 130.

The display controller 140: may start a scan according to timing implemented in each display frame; may change input image data, which is input from the outside, so as to meet a data signal format used by the data driving circuit 120, and may output the changed image data DATA; and may control data driving at an appropriate time according to the scan.

The display controller 140 may be a timing controller used by the conventional display technology or a control apparatus that includes the timing controller and further performs other control functions.

The display controller 140 may be implemented as a component separate from the data driving circuit 120, or the same, together with the data driving circuit 120, may be implemented as an Integrated Circuit (IC).

The data driving circuit 120 may be implemented such that the same includes at least one source driver IC.

Each source driver IC may include a shift register, a latch circuit, a Digital-to-Analog Converter (DAC), an output buffer, and the like, and according to the circumstances, may further include an Analog-to-Digital Converter (ADC) and the like.

The gate driving circuit 130 may be implemented such that the same includes at least one gate driver IC.

Each gate driver IC may include a shift register, a level shifter, and the like.

The data driving circuit 120 may be disposed on only one side (e.g., the upper or lower side) of the display panel 110, or may be disposed on both sides (e.g., the upper and lower sides) of the display panel 110 according to a driving scheme, a panel design scheme, and the like in some cases.

The gate driving circuit 130 may be disposed on only one side (e.g., the left or right side) of the display panel 110, or may be disposed on both sides (e.g., the left and right sides) of the display panel 110 according to a driving scheme, a panel design scheme, and the like in some cases.

The display panel 110 may be various types of display panels, including an LCD panel, an OLED panel, a PDP, and the like.

FIG. 3 is a view illustrating a touch sensing part of a touch display device according to embodiments of the present disclosure.

Referring to FIG. 3, the touch display device 10 may sense whether a touch is made by a finger and/or pen or a touch position through a capacitance-based touch sensing technique.

To this end, as illustrated in FIG. 3, the touch display device 10 may include a touch panel TSP having multiple touch electrodes TE arranged therein, and a touch circuit 300 configured to drive the touch panel TSP.

The touch display device 10 may provide a self-capacitance-based touch sensing function of sensing a touch input by measuring a capacitance, which is formed at each touch electrode TE according to whether there is a touch, a touch position, and the like, or a change in the capacitance.

The touch panel TSP may have multiple touch electrodes TE arranged therein.

The touch panel TSP may have multiple signal lines SL, which electrically connect the touch circuit 300 to the multiple touch electrodes TE, arranged therein.

The touch circuit 300 may supply a touch driving signal to at least one of the multiple touch electrodes TE, and may sense the touch electrode TE by receiving a touch sensing signal from the touch electrode TE to which the touch driving signal is applied.

The touch display device 10 may provide a mutual capacitance-based touch sensing function. In the present example, the multiple touch electrodes TE may be divided into driving electrodes (transmission electrodes) and sensing electrodes (reception electrodes); a touch driving signal may be applied to each of touch electrodes TE corresponding to the driving electrodes, and a touch sensing signal may be detected at each of touch electrodes TE corresponding to the sensing electrodes; and touch coordinates and/or whether there is a touch may be sensed based on a capacitance (mutual capacitance), which is formed between each of the touch electrodes TE corresponding to the driving electrodes and each of the touch electrodes TE corresponding to the sensing electrodes according to whether there is a touch, a touch position, and the like, or a change in the capacitance.

Hereinafter, for convenience of description, consideration is given to a case where the touch display device 10 provides a self-capacitance-based touch sensing scheme and the touch panel TSP is designed as illustrated in FIG. 3 for self-capacitance-based touch sensing.

The arrangement form, shapes, and the like of the multiple touch electrodes TE illustrated in FIG. 3 are described only by way of example, and thus, the multiple touch electrodes TE may be variously designed.

The size of an area in which one touch electrode TE is formed may correspond to that of an area in which one sub-pixel is formed.

Alternatively, the size of an area in which one touch electrode TE is formed may be larger than that of an area in which one sub-pixel is formed. In the present example, one touch electrode TE may overlap at least two data lines and at least two gate lines.

For example, the size of an area in which one touch electrode TE is formed may correspond to that of an area in which several to several tens of sub-pixels are formed.

The touch panel TSP may be of an externally mounted type (which may also be referred to as an "add-on type") in which the same is manufactured separately from the display panel 110 and is coupled to the display panel 110, or may be of an internally mounted type (which may also also be referred to as an "in-cell or on-cell type") in which the same is mounted within the display panel 110.

When the touch panel TSP is mounted within the display panel 110, while the display panel 110 is manufactured, touch electrodes TE may be formed together with other electrodes or signal wires related to display driving.

Figure 4:
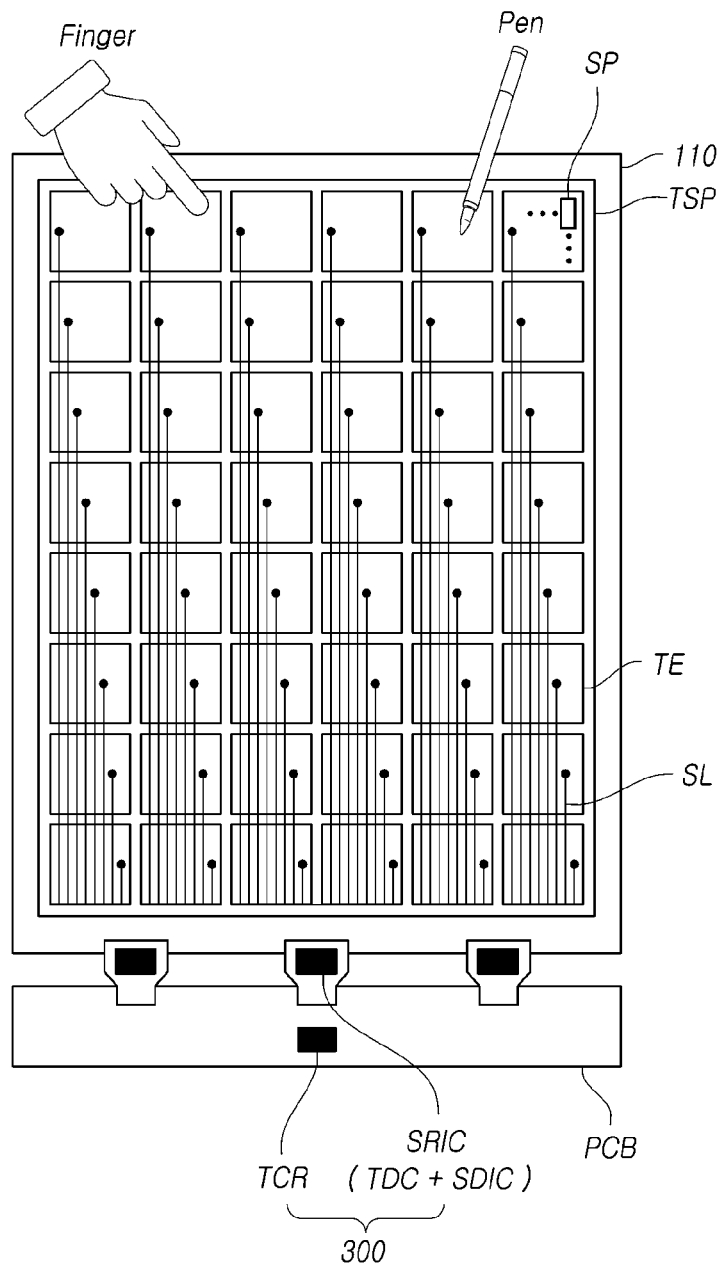
FIG. 4 is a view illustrating an example of implementation of a touch display device according to embodiments of the present disclosure.

FIG. 4 is a view illustrating an example of implementation of the touch display device 10 according to embodiments of the present disclosure. A case where the touch panel TSP is mounted within the display panel 110 is considered.

Referring to FIG. 4, the touch circuit 300 may include at least one touch driving circuit TDC configured to supply touch driving signals to the touch panel TSP and detect (receive) a touch sensing signal from the touch panel TSP, and a touch controller TCR configured to recognize whether there is a touch input, the position of the touch input, and/or the like by using a result of the detection of the touch sensing signal by the touch driving circuit TDC.

The touch circuit 300 may include at least one touch driving circuit TDC, and the respective touch driving circuits TDC or at least two touch driving circuits TDC may be implemented as one IC.

The touch driving circuit TDC included in the touch circuit 300 may be implemented as an integral IC SRIC in which the touch driving circuit TDC and a source driver IC SDIC, implementing the data driving circuit 120, are integrated.

That is, the touch display device 10 may include at least one integral IC SRIC, and each integral IC SRIC may include the touch driving circuit TDC and the source driver IC SDIC.

As described above, the implementation of integration of the touch driving circuit TDC configured to perform touch driving, and the source driver IC SDIC configured to perform data driving is an internally mounted type in which the touch panel TSP is mounted within the display panel 110, and when the signal lines SL connected to the touch electrodes TE are arranged in parallel to the data lines DL, touch driving and data driving can be effectively performed.

When the touch panel TSP is of the internally mounted type in which the same is mounted within the display panel 110, the respective touch electrodes TE may be variously configured.

When the touch display device 10 is implemented as a type of display device such as an LCD device, common electrodes, to which a common voltage is applied during a display driving interval for image display, may be divided into multiple blocks, and the multiple blocks may be utilized as multiple touch electrodes TE.

In the present example, during a touch driving interval for touch sensing, a touch driving signal may be applied to each of the touch electrodes TE or a touch sensing signal may be detected from each thereof, and during a display driving interval for image display, a common voltage may be applied to the touch electrodes TE.

During the display driving interval, the multiple touch electrodes TE may all be electrically connected in the touch circuit 300 and may be supplied with a common voltage.

During the touch driving interval, some or all of the multiple touch electrodes TE may be selected in the touch circuit 300, and the touch driving circuit TDC of the touch circuit 300 may apply a touch driving signal to the at least one selected touch electrode TE, or may detect a touch sensing signal therefrom.

Also, each touch electrode TE may include multiple slits (which may also be referred to as "holes") in order to form an electric field with pixel electrodes within multiple sub-pixels that each touch electrode TE overlaps.

When the touch display device 10 is implemented by an OLED device, common electrodes (e.g., cathode electrodes), which are arranged on the front surface of the display panel 110 and to which a common voltage is applied, may be utilized as multiple touch electrodes TE, or multiple touch electrodes TE may be separately formed on an encapsulation layer on common electrodes.

In the present example, a common electrode arranged on the front surface of the display panel 110 may be, for example, a cathode electrode among an anode electrode (corresponding to a pixel electrode) and a cathode electrode of an OLED within each sub-pixel, and a common voltage may be a cathode voltage.

In the present example, each touch electrode TE may be of the type of electrode that does not include an open area (opening portion). Each of the multiple touch electrodes TE may be a transparent electrode for light emission at sub-pixels SP.

Alternatively, each touch electrode TE may be a mesh-type electrode that includes multiple open areas (opening portions). Each open area of each touch electrode TE may correspond to a light-emitting area (e.g., an area where a part of an anode electrode is located) of a sub-pixel SP.

During a touch driving interval (a touch sensing interval), when a touch driving signal is supplied to each touch electrode TE, a Load-Free Driving (LFD) signal, identical or corresponding to the touch driving signal, may be applied to each of other electrodes and signal lines that may not be related to touch sensing.

An LFD signal may serve to remove an unnecessary parasitic capacitance formed between each touch electrode TE, to which a touch driving signal is applied, and other electrodes/signal lines that are not related to touch sensing.

As an example, an LFD signal may have a frequency and a phase identical or similar to those of a touch driving signal, and may have an amplitude identical or similar to that of the touch driving signal. When an LFD signal has at least one of a frequency, a phase, and an amplitude similar to at least one of those of a touch driving signal, the difference between the frequencies, phases, or amplitudes, which are similar to each other, may be within a predetermined allowable error range (e.g., 1%, 2%, or 5%).

For example, during a touch driving interval, an LFD signal may be applied to each of all or some of the data lines DL.

As another example, during a touch driving interval, a LFD signal may be applied to each of all or some of the gate lines GL.

As still another example, during a touch driving interval, an LFD signal may be applied to each of touch electrodes adjacent to touch sensing target touch electrodes TE, or to each of all of the touch electrodes TE.

As yet another example, during a touch driving interval, the touch driving circuit TDC may simultaneously supply touch driving signals to all of the touch electrodes TE, and may sequentially sense only at least one sensing target touch electrode TE among all of the touch electrodes TE. When touch driving signals (LFD signals) are simultaneously supplied to all of the touch electrodes TE, LFD signals may be applied to all of the data lines DL and all of the gate lines GL.

In embodiments of the present disclosure, a panel driving signal may signify all signals applied to the touch panel TSP, the display panel 110, or the display panel 110 having the built-in touch panel TSP.

Each of the touch driving circuit TDC and the source driver IC SDIC may be implemented as a Tape Carrier Package (TCP) type, a Chip-On-Film (COF) type, a Chip-On-Glass (COG) type, or the like.

Also, the integral IC SRIC, in which the touch driving circuit TDC and the source driver IC SDIC are integrated, may be implemented as a TCP type, a COF type, a COG type, or the like.

For example, when the integral IC SRIC is implemented as the COF type as in the example illustrated in FIG. 4, the integral IC SRIC may be mounted on a film, and one end part of the film, on which the integral IC SRIC is mounted, may be connected to an outer pad portion of the display panel 110, and the other end part thereof may be connected to a Printed-Circuit Board (PCB).

The PCB may have the touch controller TCR mounted thereon.

The touch driving circuit TDC and the touch controller TCR may be implemented as separate components, or may be implemented such that the former and the latter are integrated in one component.

Figure 5:
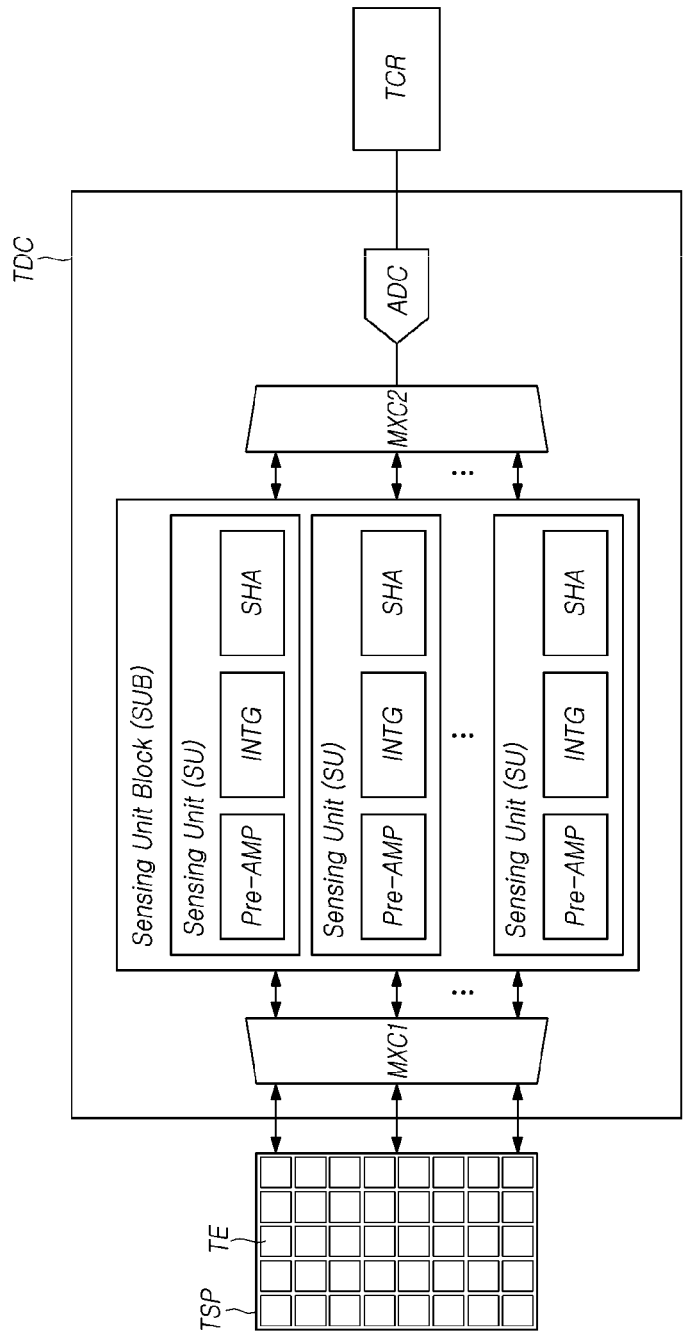
FIG. 5 is a view illustrating a touch driving circuit according to embodiments of the present disclosure.

FIG. 5 is a view illustrating a touch driving circuit TD according to embodiments of the present disclosure.

Referring to FIG. 5, the touch driving circuit TDC according to embodiments of the present disclosure may include a first multiplexer circuit MXC1, a sensing unit block SUB including multiple sensing units SU, a second multiplexer circuit MXC2, an Analog-to-Digital Converter (ADC), and the like.

The first multiplexer circuit MXC1 may include at least one or two multiplexers. The second multiplexer circuit MXC2 may include at least one or two multiplexers.

The first multiplexer circuit MXC1 may select at least one sensing target touch electrode TE among the multiple touch electrodes TE. The number of sensing target touch electrodes TE may correspond to the number of sensing units SU. That is, the number of touch electrodes TE, which can be simultaneously sensed, may be determined to be equal to the number of the sensing units SU.

The first multiplexer circuit MXC1 may supply an LFD signal, which is input from a touch power circuit, to a non-sensing target touch electrode TE without passing through a sensing unit SU. The non-sensing target touch electrodes TE are the touch electrodes except for at least one sensing target touch electrode TE. In the present example, the LFD signal may be identical to a touch driving signal. Accordingly, a touch driving signal may be referred to as an "LFD signal".

Each sensing unit SU may be configured to drive and sense a sensing target touch electrode TE, that is, an element configured to supply a touch driving signal to a sensing target touch electrode TE and detect a touch sensing signal from the sensing target touch electrode TE, and may include a pre-amplifier Pre-AMP, an integrator INTG, a sample-and-hold circuit SHA, and the like.

The pre-amplifier Pre-AMP may be electrically connected to a sensing target touch electrode TE selected by the first multiplexer circuit MXC1.

The pre-amplifier Pre-AMP may supply a touch driving signal to at least one sensing target touch electrode TE to which the first multiplexer circuit MXC1 selectively connects the pre-amplifier Pre-AMP.

Thereafter, the pre-amplifier Pre-AMP may receive a touch sensing signal from the sensing target touch electrode TE through the first multiplexer circuit MXC1. In the present example, a touch sensing signal may be a sensing signal for sensing a touch made by a finger, or may be a pen signal output from a pen.

The integrator INTG integrates signals output from the pre-amplifier Pre-AMP. The integrator INTG may be implemented to be integrated in the pre-amplifier Pre-AMP.

The sample-and-hold circuit SHA may store an integration value which is output from the integrator INTG. An integration value stored in the sample-and-hold circuit SHA of each sensing unit SU may be selectively output to the ADC by the second multiplexer circuit MXC2.

The ADC may output, to the touch controller TCR, sensing data obtained by converting an output signal (an integration value), which is output from each sensing unit SU, into a digital value.

In the present example, sensing data may be sensing data for sensing a touch made by a finger, sensing data for sensing a touch made by a pen, additional pen information, or the like.

Figure 6:
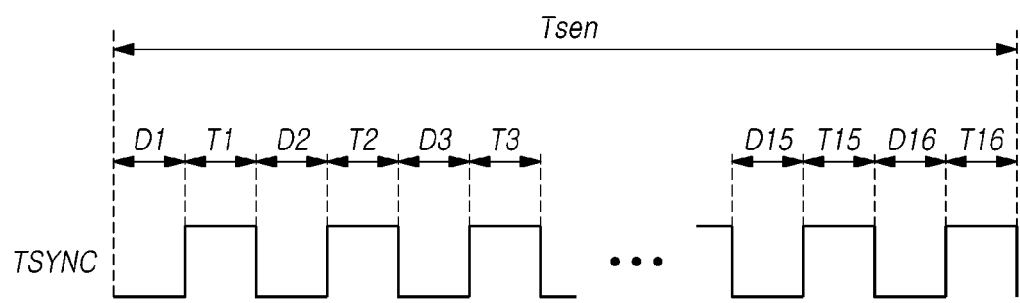
FIG. 6 is a diagram illustrating driving timing representing a time-division driving scheme for display driving and touch driving of a touch display device according to embodiments of the present disclosure.

FIG. 6 is a diagram illustrating driving timing representing a time-division driving scheme for display driving and touch driving of the touch display device 10 according to embodiments of the present disclosure.

Referring to FIG. 6, the touch display device 10 according to embodiments of the present disclosure may perform, in a time-division manner, display driving for image display and touch driving (finger and/or pen touch driving) for sensing a touch made by a finger and/or pen (a finger and/or pen touch).

The touch display device 10 may alternately assign display driving intervals (D1, D2, . . . ) and touch driving intervals (T1, T2, . . . ).

During display driving intervals (D1, D2, . . . ), display driving may be performed and an image may be displayed, and during touch driving intervals (T1, T2, . . . ), touch driving (finger touch driving and/or pen touch driving) may be performed and a finger touch and/or a pen touch may be sensed.

In such a time-division driving scheme, touch driving intervals (T1, T2, . . . ) may be blank intervals during which display driving is not performed.

The touch display device 10 may generate a synchronization signal TSYNC which goes up and down between high and low levels, and may distinguish between or may control display driving intervals (D1, D2, . . . ) and touch driving intervals (T1, T2, . . . ) by using the synchronization signal TSYNC. That is, a synchronization signal TSYNC is a driving timing control signal which defines touch driving intervals (T1, T2, . . . ).

For example, high-level intervals (or low-level intervals) of a synchronization signal TSYNC may indicate touch driving intervals (T1, T2, . . . ), and low-level intervals (or high-level intervals) thereof may indicate display driving intervals (D1, D2, . . . ).

One display frame interval may include one display driving interval and one touch driving interval. In the present example, one display frame screen may be displayed, after which touch driving may be performed.

Differently from this configuration, one display frame interval may include at least two display driving intervals (D1, D2, . . . ) and at least two touch driving intervals (T1, T2, . . . ). In the present example, touch driving may be performed multiple times during the entire interval in which one display frame screen is displayed.

For example, referring to FIG. 6, one display frame interval may include 16 display driving intervals D1 to D16 and 16 touch driving intervals T1 to T16. In the present example, one display frame screen may be displayed such that the same is divided into 16 screen areas and the 16 screen areas are displayed during 16 display driving intervals D1 to D16, and touch driving may be performed in between each pair of display driving intervals.

For example, when 16 touch driving intervals T1 to T16 passes and it is then possible to determine whether there is a touch and/or touch coordinates on the entire area of a screen, a touch sensing time required for touch sensing may be represented as Tsen. It goes without saying that a touch driving time required for touch sensing is equal to the sum of 16 touch driving intervals T1 to T16.

Figure 7:
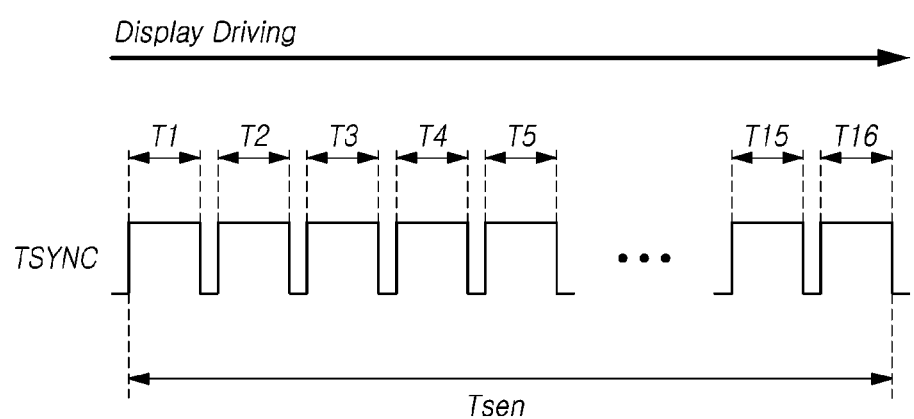
FIG. 7 is a diagram illustrating driving timing representing an independent driving scheme for display driving and touch driving of a touch display device according to embodiments of the present disclosure.

FIG. 7 is a diagram illustrating driving timing representing an independent driving scheme for display driving and touch driving of the touch display device 10 according to embodiments of the present disclosure.

Referring to FIG. 7, the touch display device 10 according to embodiments of the present disclosure may independently perform display driving for image display and touch driving (finger and/or pen touch driving) for sensing a touch made by a finger and/or pen 20 (a finger and/or pen touch).

In the present example, display driving and touch driving may be performed during different time-divided time periods as illustrated in FIG. 6, or may be simultaneously performed during an identical time period. Alternatively, as display driving and touch driving are performed in a time-division manner, display driving and touch driving may be simultaneously performed at any timing.

When display driving and touch driving are independently performed, the touch driving may be performed regardless of the display driving, and the display driving may also be performed regardless of the touch driving.

The touch display device 10 may alternately assign display driving intervals (D1, D2, . . . ) and touch driving intervals (T1, T2, . . . ).

For example, when display driving and touch driving are simultaneously performed, the touch driving may be performed while an image is displayed according to the display driving, and thus, a finger or pen touch may be sensed.

When display driving and touch driving are independently performed, display driving intervals may be controlled using a conventional display driving control signal (e.g., a vertical synchronization signal Vsync). Touch driving intervals may be controlled using a synchronization signal TSYNC.

In the present example, a synchronization signal TSYNC may define only touch driving intervals (T1, T2, . . . ) differently from the synchronization signal TSYNC of FIG. 6 which defines display driving intervals (D1, D2, . . . ) and touch driving intervals (T1, T2, . . . ) by distinguishing between the former and the latter.

For example, a time period during which a synchronization signal TSYNC has a high level (or a low level) may indicate touch driving intervals (T1, T2, . . . ) during which touch driving is performed, and a time period during which the synchronization signal TSYNC has a low level (or a high level) may indicate a time period during which touch driving is not performed.

During one high-level interval (or one low-level interval), that is, one touch driving interval, in a synchronization signal TSYNC, a finger and/or pen touch may be sensed once on the entire area of a screen. In the present example, one touch driving interval may correspond to one touch frame interval.

Differently from this configuration, during at least two high-level intervals (or at least two low-level intervals), that is, at least two touch driving intervals, in a synchronization signal TSYNC, a finger and/or pen touch may be sensed once on the entire area of a screen. In the present example, at least two touch driving intervals may correspond to one touch frame interval.

For example, during 16 high-level intervals (or 16 low-level intervals), that is, 16 touch driving intervals, in the synchronization signal TSYNC, a finger and/or pen touch may be sensed once on the entire area of a screen. In the present example, 16 touch driving intervals may correspond to one touch frame interval.

During each of the touch driving intervals (T1, T2, . . . ), finger touch driving for sensing a finger touch may be performed, or pen touch driving for sensing a pen touch may be performed.

Also, the touch panel TSP may be mounted within the display panel 110, or may be disposed on the outside of the display panel 110. Hereinafter, for convenience of description, a description will be made of an example in which the touch panel TSP is mounted within the display panel 110.

Figure 8:
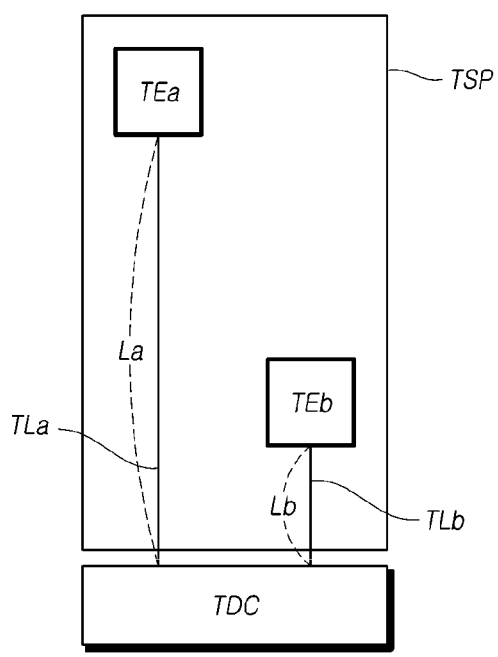
FIG. 8 is a view illustrating two touch electrodes which have different time constants and are arranged in a touch panel of a touch display device according to embodiments of the present disclosure.
Figure 9:
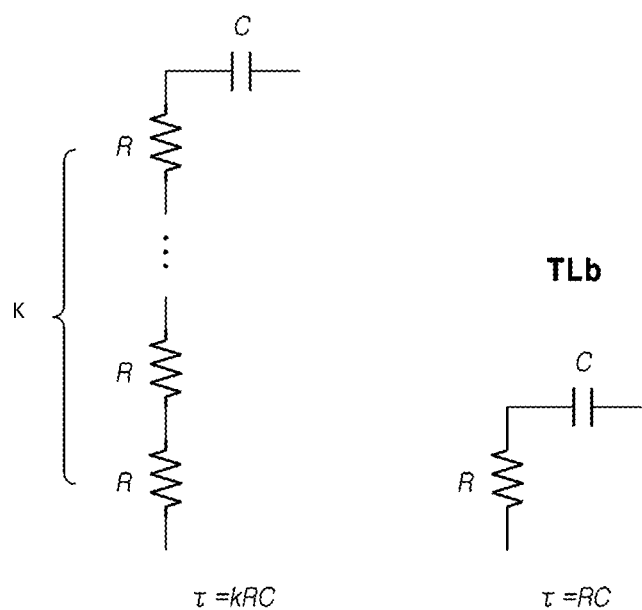
FIG. 9 is a view illustrating each of time constants of two touch electrodes, arranged in a touch panel of a touch display device, as an RC delay according to embodiments of the present disclosure.

FIG. 8 is a view illustrating two touch electrodes TEa and TEb which have different time constants τ and are arranged in the touch panel TSP of the touch display device 10 according to embodiments of the present disclosure. FIG. 9 is a view illustrating each of time constants τ of the two touch electrodes TEa and TEb, arranged in the touch panel TSP of the touch display device 10, as an RC delay according to embodiments of the present disclosure.

Referring to FIG. 8, multiple touch electrodes TE arranged in the touch panel TSP may include the first touch electrode TEa and the second touch electrode TEb.

The first touch electrode TEa is representative of touch electrodes having time constants τ larger than that of the second touch electrode TEb. In contrast, the second touch electrode TEb is representative of touch electrodes having time constants τ smaller than that of the first touch electrode TEa.

The effective length Lb of a path TLb through which a touch driving signal TDS is delivered from the touch driving circuit TDC to the second touch electrode TEb may be shorter than the effective length La of a path TLa through which a touch driving signal TDS is delivered from the touch driving circuit TDC to the first touch electrode TEa.

The path TLa through which a touch driving signal TDS output from the touch driving circuit TDC is delivered to the first touch electrode TEa may conceptually include not only a touch line TL, which connects the touch driving circuit TDC to the first touch electrode TEa, but also all of patterns, pads, and the like that are electrically connected to the touch line TL. The path TLb through which a touch driving signal TDS output from the touch driving circuit TDC is delivered to the second touch electrode TEb may conceptually include not only a touch line TL, which connects the touch driving circuit TDC to the second touch electrode TEb, but also all of patterns, pads, and the like that are electrically connected to the touch line TL.

The effective lengths La and Lb may conceptually cover not only a physical length, such as a touch line TL, but also circuit elements and the like that obstruct signal delivery.

The first touch electrode TEa has a time constant τ larger than that of the second touch electrode TEb, and typically may be located farther from the touch driving circuit TDC than the second touch electrode TEb is.

The above-described time constant τ will be described below.

A time constant τ is an index indicating how quickly or slowly each of the touch electrodes TEa and TEb responds to an input, that is, a touch driving signal TDS supplied to each thereof, and may also signify the time required for the current or voltage in a circuit to rise or fall up to 63.2% or 36.8% of it's normal value.

In other words, when a touch driving signal TDS, which is a voltage signal having a variable voltage level, is applied to each of the touch electrodes TEa and TEb, if the voltage level of the touch driving signal TDS goes to a high voltage level from a low voltage level, a current or voltage gradually increases to reach a predetermined value relative to a normal value (the high-level voltage), for example, 63.2% of the normal value, and at this time, the increasing rate of the current or voltage may signify a time constant τ.

Also, when the touch driving signal TDS, which is a voltage signal having a variable voltage level, is applied to each of the touch electrodes TEa and TEb, if a voltage level of the touch driving signal TDS goes to a low voltage level from a high voltage level, a current or voltage gradually decreases to reach a predetermined value relative to a normal value (the low-level voltage), for example, 36.8% of the normal value, and at this time, the decreasing rate of the current or voltage may signify a time constant τ.

As described above, when the touch driving signal TDS is applied to each of the touch electrodes TEa and TEb, the time constant τ may be a constant which represents the changing speed of a transient phenomenon of a circuit including each of the touch electrodes TEa and TEb, and may be, for example, an RC delay (R and C represent resistance and capacitance, respectively). In the present example, R (resistance) may be the resistance of a path (a circuit) through which a touch driving signal TDS is delivered from the touch driving circuit TDC to each of the touch electrodes TEa and TEb, and C (capacitance) may be the capacitance generated in a circuit (including the touch electrode TE) through which the touch driving signal TDS is delivered from the touch driving circuit TDC to each of the touch electrodes TEa and TEb.

Referring to the example illustrated in FIG. 9, a circuit including the first touch electrode TEa and the touch driving circuit TDC may correspond to an equivalent circuit that includes a k number of resistors all having a resistance of R (where k represents a natural number larger than or equal to 2) and one capacitor having a capacitance of C. In the present example, an RC delay corresponding to a time constant of the first touch electrode TEa may be kRC.

Referring to the example illustrated in FIG. 9, a circuit including the second touch electrode TEb and the touch driving circuit TDC may correspond to an equivalent circuit that includes one resistor having a resistance of R and one capacitor having a capacitance of C. In the present example, an RC delay corresponding to a time constant of the second touch electrode TEb may be RC.

Figure 10:
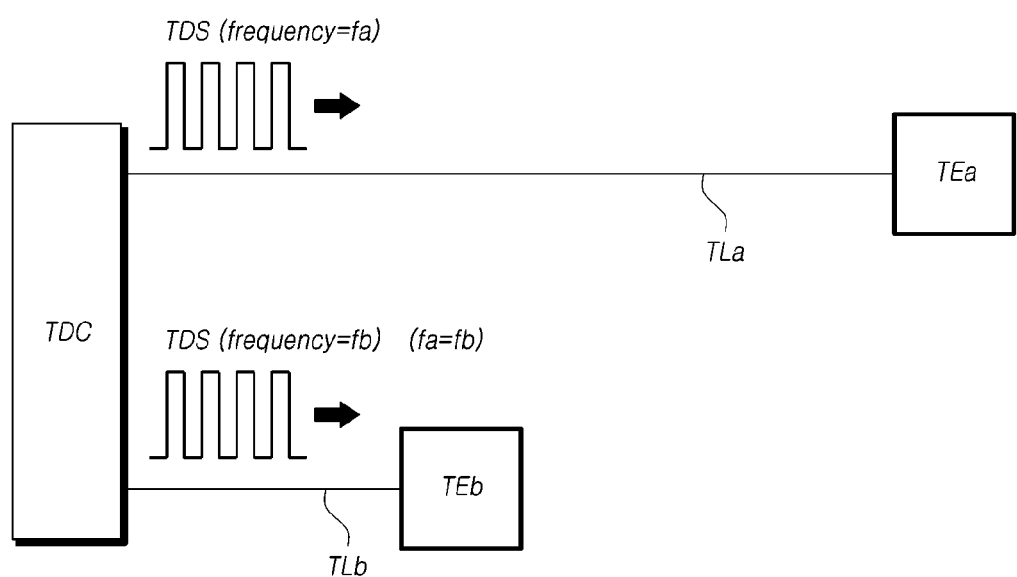
FIG. 10 is a view illustrating a touch driving signal supplied to each of two touch electrodes, arranged in a touch panel of a touch display device and having a difference between time constants thereof, without considering the difference, when the touch driving signal is supplied thereto according to embodiments of the present disclosure.

FIG. 10 is a view illustrating a touch driving signal TDS supplied to each of the two touch electrodes TEa and TEb, arranged in the touch panel TSP of the touch display device 10 and having a difference between time constants τ thereof, without considering the difference, when the touch driving signal TDS is supplied thereto according to embodiments of the present disclosure.

Referring to FIG. 10, when a touch driving signal TDS is supplied to each of the two touch electrodes TEa and TEb arranged in the touch panel TSP, the touch driving circuit TDC may supply a touch driving signal TDS to each of the two touch electrodes TEa and TEb without considering the difference between time constants τ of the former and the latter.

Touch driving signals TDS respectively supplied to the two touch electrodes TEa and TEb having different time constants τ may be identical modulation signals having a variable voltage level, and may both have an identical signal characteristic.

The identical signal characteristic may be a driving frequency, and according to the circumstances, examples of the identical signal characteristic may include an amplitude, a phase, the number of pulses, a signal polarity, and the like.

For example, a driving frequency fa of a touch driving signal TDS supplied to the first touch electrode TEa may be identical to a driving frequency fb of a touch driving signal TDS supplied to the second touch electrode TEb.

As another example, a touch driving signal TDS supplied to the first touch electrode TEa may be identical to a touch driving signal TDS supplied to the second touch electrode TEb in terms of driving frequency fb, an amplitude, a phase, the number of pulses, a signal polarity, and the like.

As described above, when touch driving signals TDS respectively supplied to the two touch electrodes TEa and TEb having different time constants τ are identical to each other, particularly, when the former and the latter have an identical driving frequency, a time in which a touch driving signal TDS is supplied to the second touch electrode TEb having a smaller time constant τ, that is, the time length of the touch driving signal TDS may be unnecessarily long.

Accordingly, the necessary time Tsen may become too long in order to complete sensing of all the touch electrodes or as many touch electrodes as required among the multiple touch electrodes TE arranged in the touch panel TSP.

Accordingly, embodiments of the present disclosure propose a variable signal characteristic technique for, during touch driving, supplying touch driving signals TDS having different signal characteristics to the touch electrodes TEa and TEb having a difference between time constants τ thereof by considering the difference.

The variable signal characteristic technique may include, as an example, a variable driving-frequency technique for supplying touch driving signals TDS having different driving frequencies to the touch electrodes TEa and TEb having a difference between time constants τ thereof by considering the difference.

A variable signal characteristic technique, particularly, a touch driving method, to which a variable driving-frequency technique is applied, will be described in more detail below.

Figure 11:
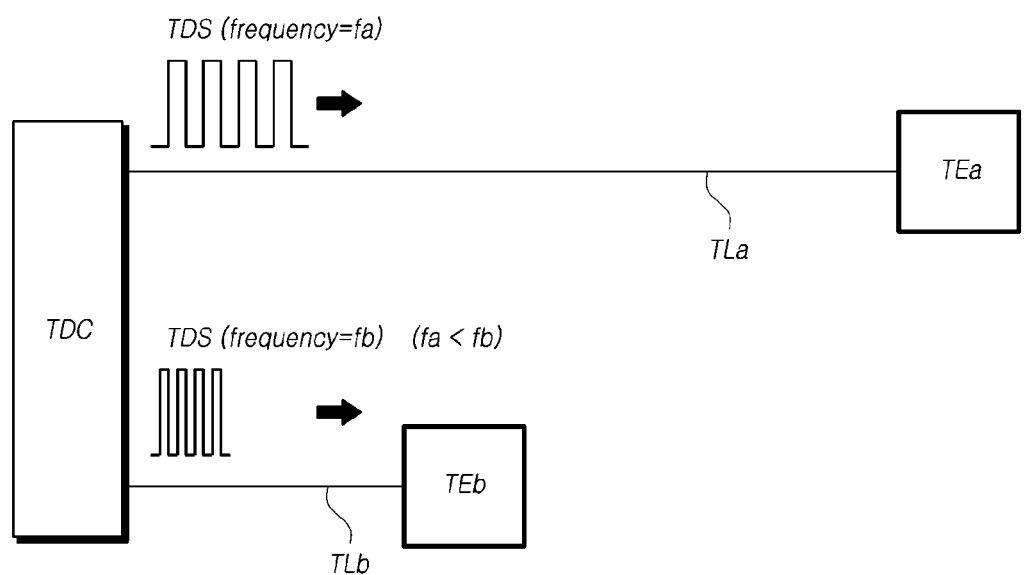
FIG. 11 is a view illustrating a touch driving signal supplied to each of two touch electrodes, arranged in a touch panel of a touch display device and having a difference between time constants thereof, using a variable driving-frequency technique considering the difference, when the touch driving signal is supplied thereto according to embodiments of the present disclosure.

FIG. 11 is a view illustrating a touch driving signal TDS supplied to each of the two touch electrodes TEa and TEb, arranged in the touch panel TSP of the touch display device 10 and having a difference between time constants τ thereof, using a variable driving-frequency technique considering the difference, when the touch driving signal TDS is supplied thereto according to embodiments of the present disclosure.

The touch display device 10 according to embodiments of the present disclosure may include the touch panel TSP having multiple touch electrodes TE arranged therein, and the touch driving circuit TDC configured to supply a touch driving signal TDS to at least one of the multiple touch electrodes TE and receive a touch sensing signal according to the supply of the touch driving signal TDS.

The multiple touch electrodes TE arranged in the touch panel TSP may include the first touch electrode TEa and the second touch electrode TEb that have different time constants τ.

The touch driving circuit TDC may perform touch driving by using a variable signal characteristic technique considering the difference between time constants of touch electrodes. That is, the touch driving circuit TDC may supply touch driving signals TDS having different signal characteristics to the touch electrodes TEa and TEb having a difference between time constants τ, by considering the difference therebetween.

More specifically, the second touch electrode TEb has a time constant smaller than that of the first touch electrode TEa. In the present example, the touch driving signal TDS that the touch driving circuit TDC supplies to the second touch electrode TEb may have a signal characteristic different from that of a touch driving signal TDS that the touch driving circuit TDC supplies to the first touch electrode TEa.

Examples of the above-described signal characteristic of the touch driving signal TDS may include a driving frequency, the number of pulses, an amplitude, a phase, a voltage polarity, and the like.

As described above, the touch driving circuit TDC may perform more effective touch driving by supplying touch driving signals TDS having different signal characteristics to the touch electrodes TEa and TEb having a difference between time constants thereof.

As an example of the above-described variable signal characteristic technique, the touch driving circuit TDC may perform touch driving by using a variable driving-frequency technique considering the difference between time constants of touch electrodes.

In the present example, the touch driving circuit TDC may supply touch driving signals TDS having different driving frequencies fa and fb to the touch electrodes TEa and TEb having a difference between time constants τ, by considering the difference therebetween.

More specifically, when the second touch electrode TEb has a time constant τ smaller than that of the first touch electrode TEa, a touch driving signal TDS supplied to the second touch electrode TEb may have a driving frequency fb which is higher than the driving frequency fa of a touch driving signal TDS supplied to the first touch electrode TEa (fa<fb).

A touch driving signal TDS supplied to the second touch electrode TEb may have pulses the number of which is identical to the number of pulses of a touch driving signal TDS supplied to the first touch electrode TEa.

Accordingly, the touch driving circuit TDC may perform touch driving by using a touch electrode-specific variable driving-frequency technique considering the difference between time constants, so that a touch driving signal TDS having a short time length can be supplied to the touch electrode TEb that does not need to be supplied with a touch driving signal TDS having an unnecessarily long time length. Therefore, it is possible to reduce the total touch sensing time Tsen required to complete sensing of all the touch electrodes or as many touch electrodes TE as required among the multiple touch electrodes TE arranged in the touch panel TSP.

A time constant τ is also related to the signal delivery length of a touch driving signal TDS.

A case where a time constant τ of the second touch electrode TEb is smaller than that of the first touch electrode TEa may signify that the effective length Lb of a path TLb through which a touch driving signal TDS is delivered from the touch driving circuit TDC to the second touch electrode TEb is shorter than the effective length La of a path TLa through which a touch driving signal TDS is delivered from the touch driving circuit TDC to the first touch electrode TEa.

A time constant τ may be an RC delay.

In this regard, both the first touch line TLa configured to connect the touch driving circuit TDC to the first touch electrode TEa, and the second touch line TLb configured to connect the touch driving circuit TDC to the second touch electrode TEb are arranged in the touch panel TSP.

The time constant τ of the first touch electrode TEa may correspond to an RC delay of the touch driving circuit TDC, the first touch line TLa, and the first touch electrode TEa.

The time constant τ of the second touch electrode TEb may correspond to an RC delay of the touch driving circuit TDC, the second touch line TLb, and the second touch electrode TEb.

Accordingly, the touch driving circuit TDC may perform touch driving by using a touch electrode-specific variable driving-frequency technique considering the difference between signal delivery lengths, so that a touch driving signal TDS having a short time length can be supplied to the touch electrode TEb that does not need to be supplied with a touch driving signal TDS having an unnecessarily long time length. Therefore, it is possible to reduce the total touch sensing time Tsen required to complete sensing of all the touch electrodes or as many touch electrodes TE as required among the multiple touch electrodes TE arranged in the touch panel TSP.

A time constant τ may also be related to a touch electrode-specific position.

The first and second touch electrodes TEa and TEb having a difference between time constants may be arranged at different positions in the touch panel TSP.

The second touch electrode TEb having a smaller time constant τ may be located nearer to the touch driving circuit TDC than the first touch electrode TEa having a larger time constant τ is.

In the present example, a touch driving signal TDS supplied to the second touch electrode TEb may have a driving frequency fb which is higher than the driving frequency fa of a touch driving signal TDS supplied to the first touch electrode TEa (fa<fb).

A touch driving signal TDS supplied to the second touch electrode TEb may have pulses the number of which is identical to the number of pulses of a touch driving signal TDS supplied to the first touch electrode TEa.

Accordingly, the touch driving circuit TDC may perform touch driving by using a touch electrode-specific variable driving-frequency technique considering a touch electrode-specific position, so that a touch driving signal TDS having a short time length can be supplied to the touch electrode TEb that does not need to be supplied with a touch driving signal TDS having an unnecessarily long time length. Therefore, it is possible to reduce the total touch sensing time Tsen required to complete sensing of all the touch electrodes or as many touch electrodes TE as required among the multiple touch electrodes TE arranged in the touch panel TSP.

Figure 12:
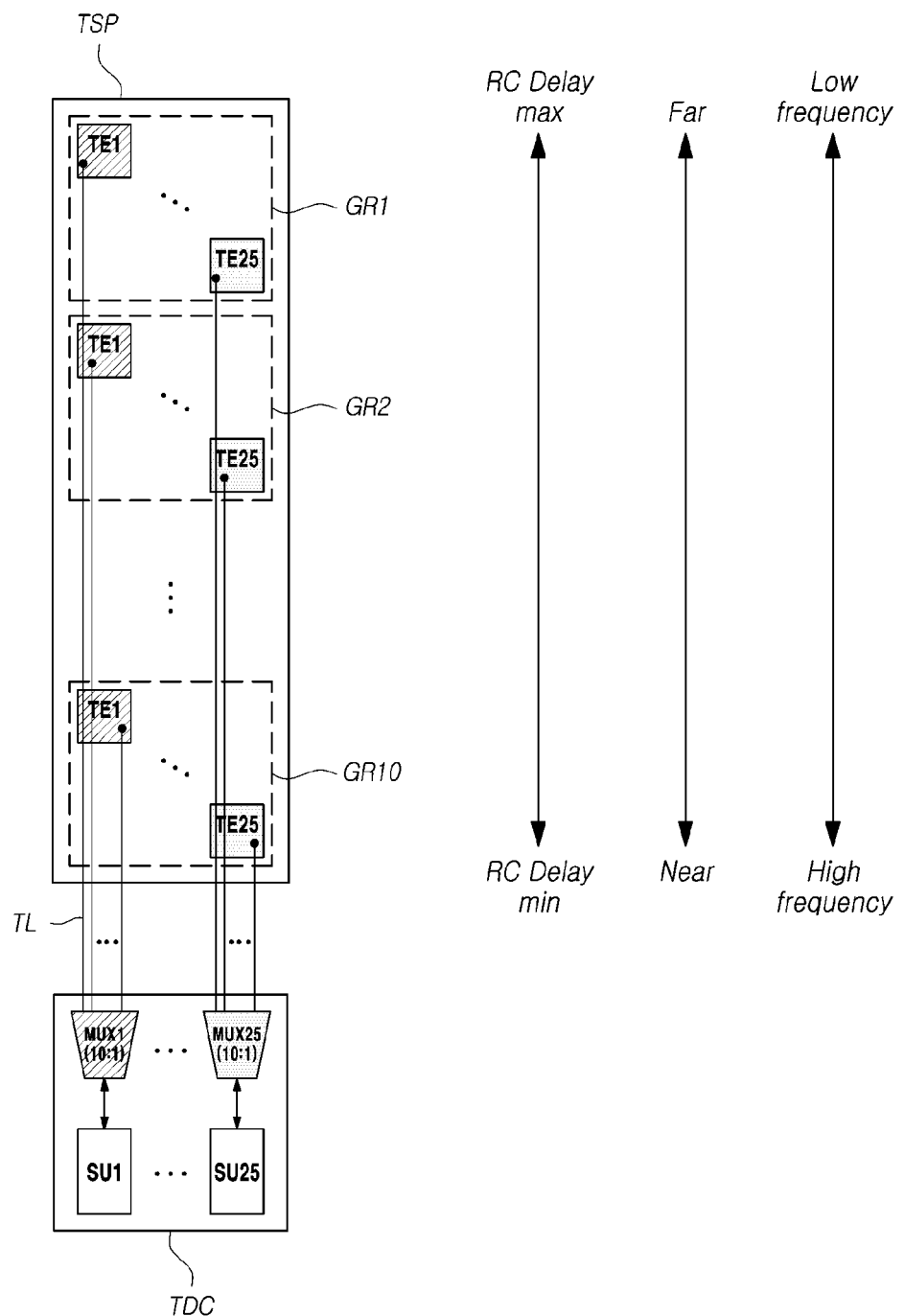
FIGS. 12 and 13 are views illustrating a multiplexer-driving scheme for multiple touch electrodes arranged in a touch panel of a touch display device, and a variable driving-frequency technique considering the difference between time constants of sensing groups during the multiplexer-driving scheme according to embodiments of the present disclosure.
Figure 13:
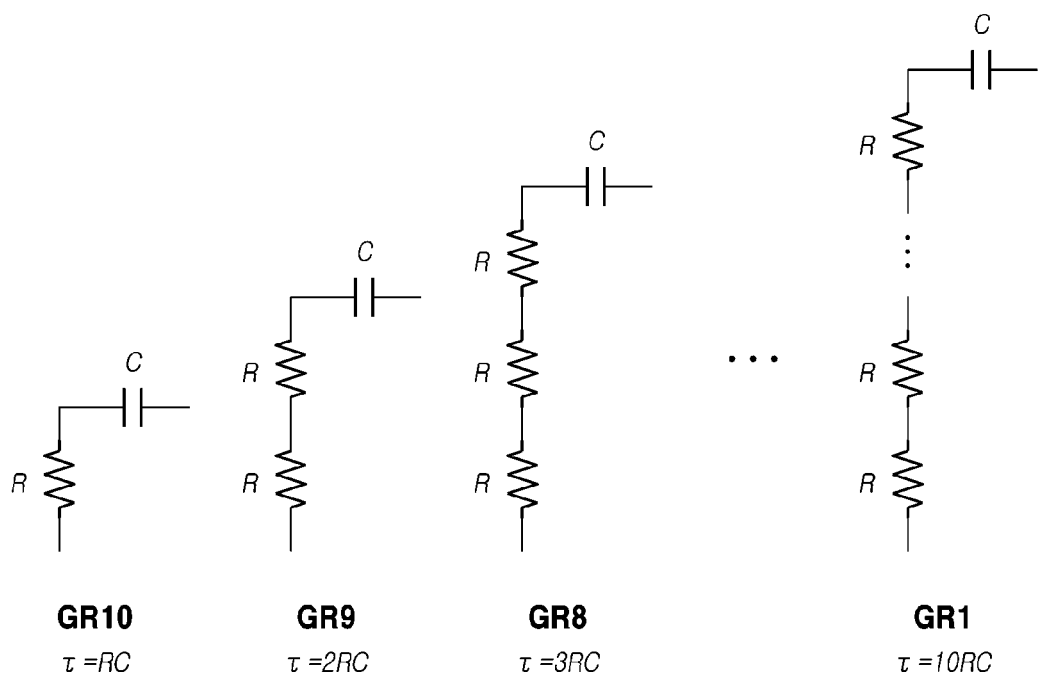

FIGS. 12 and 13 are views illustrating a multiplexer-driving scheme for the multiple touch electrodes TE arranged in the touch panel TSP of the touch display device 10, and a variable driving-frequency technique considering the difference between time constants τ of sensing groups during the multiplexer-driving scheme according to embodiments of the present disclosure.

Figure 14:
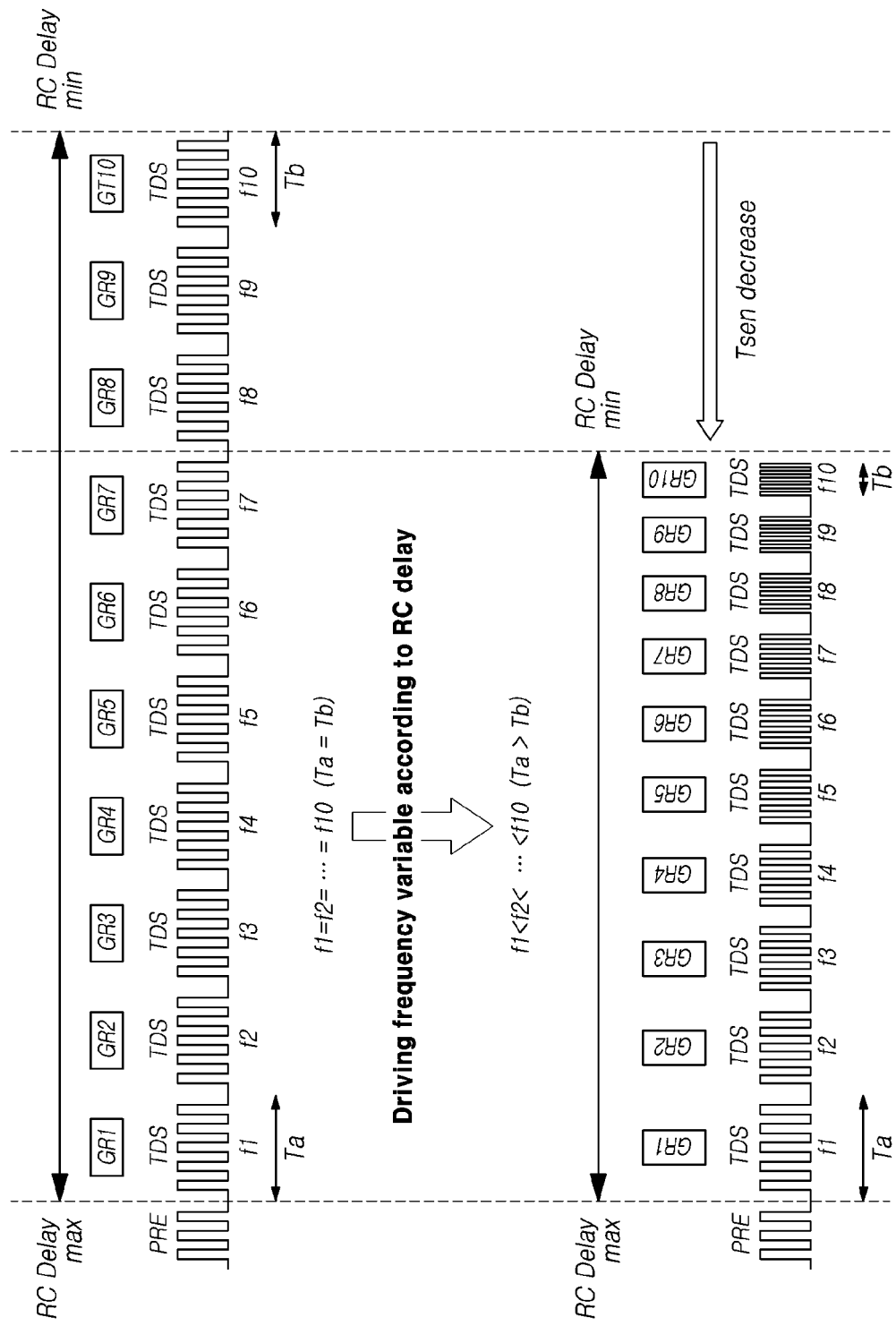
FIG. 14 is a diagram illustrating driving timing to which a variable driving-frequency technique considering the difference between time constants of sensing groups is applied during multiplexer-driving of multiple touch electrodes arranged in a touch panel of a touch display device according to embodiments of the present disclosure.

FIG. 14 is a diagram illustrating driving timing to which a variable driving-frequency technique considering the difference between time constants τ of sensing groups is applied during multiplexer-driving of the multiple touch electrodes TE arranged in the touch panel TSP of the touch display device 10 according to embodiments of the present disclosure.

According to the example illustrated in FIG. 12, 250 touch electrodes TE may be arranged in the touch panel TSP. The touch driving circuit TDC may include 25 multiplexers MUX1 to MUX25 and 25 sensing units SU1 to SU25 configured to respectively correspond to the 25 multiplexers MUX1 to MUX25.

The 25 multiplexers MUX1 to MUX25 constitute the first multiplexer circuit MXC1 illustrated in FIG. 5. The 25 sensing units SU1 to SU25 are the sensing units SU included in the sensing unit block SUB illustrated in FIG. 5.

Each of the 25 multiplexers MUX1 to MUX25 may be a 10-to-1 multiplexer. Accordingly, each of the 25 multiplexers MUX1 to MUX25 selects one of 10 touch electrodes and connects the same to the relevant sensing unit.

The 250 touch electrodes TE may be divided into groups of touch electrodes capable of being simultaneously sensed. The 250 touch electrodes TE may be divided into 10 sensing groups GR1 to GR10, each including 25 touch electrodes TE1 to TE25.

The 25 touch electrodes TE1 to TE25 included in each of the 10 sensing groups GR1 to GR10 may be simultaneously sensed. The 10 sensing groups GR1 to GR10 may be sequentially sensed.

The 25 touch electrodes TE1 to TE25 included in each of the 10 sensing groups GR1 to GR10 may be connected to the 25 multiplexers MUX1 to MUX25 such that the former respectively correspond to the latter.

The touch electrodes TE1 respectively included in the 10 sensing groups GR1 to GR10 are all connected to the multiplexer MUX1. The touch electrodes TE2 respectively included in the 10 sensing groups GR1 to GR10 are all connected to the multiplexer MUX2. In this manner, the 25 touch electrodes TE1 to TE25 included in each of the 10 sensing groups GR1 to GR10 may be connected to the 25 multiplexers MUX1 to MUX25 such that the former respectively correspond to the latter. The touch electrodes TEi respectively included in the 10 sensing groups GR1 to GR10 are all connected to the multiplexer MUX1, wherein i has a value ranging between 1 and 25.

A multiplexer-driving scheme using the above-described configuration will be described below.

In the touch driving circuit TDC, through the 25 multiplexers MUX1 to MUX25, the 25 sensing units SU1 to SU25 simultaneously supply touch driving signals TDS to the 25 touch electrodes TE1 to TE25, which are included in the first sensing group GR1 among the 10 sensing groups GR1 to GR10, and receive touch sensing signals therefrom, thereby sensing the first sensing group GR1.

Then, in the touch driving circuit TDC, through the 25 multiplexers MUX1 to MUX25, the 25 sensing units SU1 to SU25 simultaneously supply touch driving signals TDS to the 25 touch electrodes TE1 to TE25, which are included in the second sensing group GR2 among the 10 sensing groups GR1 to GR10, and receive touch sensing signals therefrom, thereby sensing the second sensing group GR2.

Then, in the touch driving circuit TDC, through the 25 multiplexers MUX1 to MUX25, the 25 sensing units SU1 to SU25 simultaneously supply touch driving signals TDS to the 25 touch electrodes TE1 to TE25, which are included in the third sensing group GR3 among the 10 sensing groups GR1 to GR10, and receive touch sensing signals therefrom, thereby sensing the third sensing group GR3.

In this manner, in the touch driving circuit TDC, the 25 sensing units SU1 to SU25 sense the fourth to tenth sensing groups GR4 to GR10. Accordingly, the 25 sensing units SU1 to SU25 sense all of the 250 touch electrodes arranged in the touch panel TSP.

Among the 10 sensing groups GR1 to GR10, the 25 touch electrodes TE1 to TE25 included in the first sensing group GR1 may have the largest time constant τ, and the 25 touch electrodes TE1 to TE25 included in the tenth sensing group GR10 may have the smallest time constant τ.

That is, a time constant τ may become smaller in the direction from the first sensing group GR1 to the tenth sensing group GR10. In contrast, the time constant τ may become larger in the direction from the tenth sensing group GR10 to the first sensing group GR1.

Also, among the 10 sensing groups GR1 to GR10, the 25 touch electrodes TE1 to TE25 included in the first sensing group GR1 may have the largest RC delay (10RC), and the 25 touch electrodes TE1 to TE25 included in the tenth sensing group GR10 may have the smallest RC delay (RC).

That is, an RC delay may become smaller (10RC, . . . , 3RC, 2RC, RC) in the direction from the first sensing group GR1 to the tenth sensing group GR10. In contrast, the RC delay may become larger (RC, 2RC, 3RC, ..., 10RC) in the direction from the tenth sensing group GR10 to the first sensing group GR1.

Also, among the 10 sensing groups GR1 to GR10, the 25 touch electrodes TE1 to TE25 included in the first sensing group GR1 may be located farthest from the touch driving circuit TDC, and the 25 touch electrodes TE1 to TE25 included in the tenth sensing group GR10 may be located nearest to the touch driving circuit TDC.

That is, a sensing group may become nearer to the touch driving circuit TDC in the direction from the first sensing group GR1 to the tenth sensing group GR10. In contrast, the sensing group may become farther from the touch driving circuit TDC in the direction from the tenth sensing group GR10 to the first sensing group GR1.

As illustrated in FIG. 14, when touch driving is performed without considering the difference between time constants (the difference between RC delays) of the 10 sensing groups GR1 to GR10 or the difference between positions of touch electrodes (the difference between signal delivery lengths) thereof, driving frequencies f1 to f25 of touch driving signals TDS respectively applied to the 10 sensing groups GR1 to GR10 are all identical to one another (f1= f2= ... =f25).

As illustrated in FIGS. 13 and 14, when touch driving is performed such that a variable driving-frequency technique is applied to the touch driving, wherein the variable driving-frequency technique considers the difference between time constants (the difference between RC delays) of the 10 sensing groups GR1 to GR10 or the difference between positions of touch electrodes (the difference between signal delivery lengths) included therein, a driving frequency f1 of a touch driving signal TDS, which is applied to the 25 touch electrodes TE1 to TE25 included in the first sensing group GR1 that has the largest time constant and RC delay or that is located farthest from the touch driving circuit TDC, may be the lowest. Also, a driving frequency f10 of a touch driving signal TDS, which is applied to the 25 touch electrodes TE1 to TE25 included in the tenth sensing group GR10 that has the smallest time constant and RC delay or that is located nearest to the touch driving circuit TDC, may be the highest.

For example, a driving frequency of a touch driving signal TDS may become higher in the direction from the first sensing group GR1 to the tenth sensing group GR10. In contrast, the driving frequency of the touch driving signal TDS may become lower (f1<f2< ... <f10) in the direction from the tenth sensing group GR10 to the first sensing group GR1.

Referring to FIG. 14, when touch driving is performed without considering the difference between time constants (the difference between RC delays) of the 10 sensing groups GR1 to GR10 or the difference between the positions (the difference between signal delivery lengths) of the touch electrodes included therein, a time length Ta of a touch driving interval, during which a touch driving signal TDS is applied to the 25 touch electrodes TE1 to TE25 included in the first sensing group GR1 having the largest time constant and RC delay or located farthest from the touch driving circuit TDC, is identical to a time length Tb of a touch driving interval during which a touch driving signal TDS is applied to the 25 touch electrodes TE1 to TE25 included in the tenth sensing group GR10 having the smallest time constant and RC delay or located nearest to the touch driving circuit TDC.

However, when touch driving is performed using the variable driving-frequency technique considering the difference between time constants (the difference between RC delays) of the 10 sensing groups GR1 to GR10 or the difference between the positions (the difference between signal delivery lengths) of the touch electrodes included therein, a time length Ta of a touch driving interval, during which a touch driving signal TDS is applied to the 25 touch electrodes TE1 to TE25 included in the first sensing group GR1 that has the largest time constant and RC delay or that is located farthest from the touch driving circuit TDS, is the longest, and a time length Tb of a touch driving interval, during which a touch driving signal TDC is applied to the 25 touch electrodes TE1 to TE25 included in the tenth sensing group GR10 that has the smallest time constant and RC delay or that is located nearest to the touch driving circuit TDC, is the shortest. That is, a first touch electrode sensing interval (touch driving interval), during which a touch driving signal TDS is supplied to a first touch electrode (e.g., a touch electrode included in the first sensing group GR1) disposed farther from the touch driving circuit TDC, may be different from a second touch electrode sensing interval (touch driving interval) during which a touch driving signal TDS is supplied to a second touch electrode (e.g., a touch electrode included in the tenth sensing group GR10) disposed near the touch driving circuit TDC.

For example, as a driving frequency of a touch driving signal TDS becomes higher in the direction from the first sensing group GR1 to the tenth sensing group GR10 (f1< f2< ... <f10), the time length of a touch driving interval may become shorter.

Accordingly, touch driving is performed using a variable driving-frequency technique considering the difference between time constants (the difference between RC delays) of the 10 sensing groups GR1 to GR10 or the difference between the positions (the difference between signal delivery lengths) of the touch electrodes included therein, making it possible to significantly reduce the total touch sensing time Tsen required to sense all of the 10 sensing groups GR1 to GR10.

When the driving timing illustrated in FIG. 14 is driving timing for time-division driving, display driving may be performed during every touch driving interval in which each of the 10 sensing groups GR1 to GR10 is driven and sensed.

An interval during which all of the 10 sensing groups GR1 to GR10 are driven and sensed may correspond to one display frame interval.

Differently from this configuration, an interval during which all of the 10 sensing groups GR1 to GR10 are driven and sensed may correspond to 25 display frame intervals. That is, an interval (a touch driving interval) during which each of the 10 sensing groups GR1 to GR10 is driven and sensed may correspond to one display frame interval.

Referring to FIG. 12, the 25 touch electrodes TE1 to TE25 included in each of the 10 sensing groups GR1 to GR10 may actually have different time constants (RC delays), or may actually have different distances (signal delivery lengths) from the touch driving circuit TDC.

However, it is assumed that the 25 touch electrodes TE1 to TE25 included in each of the 10 sensing groups GR1 to GR10 do not have a difference between time constants thereof and a difference between signal delivery lengths thereof.

Also, a touch electrode (e.g., the first touch electrode TE1), which has the largest time constant, has the longest signal delivery length, or is located farthest from the touch driving circuit TDC among the 25 touch electrodes TE1 to TE25 included in each of the 10 sensing groups GR1 to GR10, is regarded as a representative touch electrode that is representative of each of the 10 sensing groups GR1 to GR10.

When driving frequencies respectively corresponding to the 10 sensing groups GR1 to GR10 are determined, the driving frequencies are determined by comparing time constants, signal delivery lengths, or positions of the respective representative touch electrodes (e.g., the first touch electrodes TE1) of the 10 sensing groups GR1 to GR10.

A driving frequency f may be determined by an RC delay, which is a time constant, and Equation (1) below.

$$f \propto \frac{1}{2\prod RC} \qquad (1)$$

Referring to FIGS. 12 and 14, a multiplexer connection structure will be described below.

All of the touch electrodes arranged in the touch panel TSP may include: a first touch electrode (e.g., TE1 to TE25 included in GR1) which, from a relative point of view, has a large time constant, has a long signal delivery length (e.g., a TL length), or is located farther from the touch driving circuit TDC; and a second touch electrode (e.g., TE1 to TE25 included in GR10) which, from a relative point of view, has a smaller time constant, has a short signal delivery length (e.g., a TL length), or is located near the touch driving circuit TDC.

For example, the first touch electrode (e.g., TE1 among TE1 to TE25 included in GR1) and the second touch electrode (e.g., TE1 among TE1 to TE25 included in GR10) may both be connected to a first multiplexer (e.g., MUX1) included in the touch driving circuit TDC.

As another example, the first touch electrode (e.g., TE1 among TE1 to TE25 included in GR1) and the second touch electrode (e.g., TE25 among TE1 to TE25 included in GR10) may be separately connected to a first multiplexer (e.g., MUX1) and a second multiplexer (e.g., MUX25) that are different and are included in the touch driving circuit TDC.

When a touch driving signal TDS is supplied to the second touch electrode (e.g., TE25 among TE1 to TE25 included in GR10) connected to the second multiplexer (e.g., MUX25), the touch driving signal TDS may be supplied to a third touch electrode (e.g., TE1 among TE1 to TE25 included in GR10) connected to the first multiplexer (e.g., MUX1).

In the present example, the third touch electrode (e.g., TE1 among TE1 to TE25 included in GR10) and the second touch electrode (e.g., TE25 among TE1 to TE25 included in GR10) are connected to different multiplexers (e.g., MUX1 and MUX25), but may be touch electrodes included in an identical sensing group (e.g., GR10).

Accordingly, a touch driving signal TDS supplied to the third touch electrode (e.g., TE1 among TE1 to TE25 included in GR10) may have a driving frequency identical to that of a touch driving signal TDS supplied to the second touch electrode (e.g., TE25 among TE1 to TE25 included in GR10).

When a touch driving signal TDS is supplied to the first touch electrode (e.g., TE1 among TE1 to TE25 included in GR1) connected to the first multiplexer (e.g., MUX1), the touch driving signal TDS may be supplied to a fourth touch electrode (e.g., TE25 among TE1 to TE25 included in GR1) connected to the second multiplexer (e.g., MUX25).

In the present example, the fourth touch electrode (e.g., TE25 among TE1 to TE25 included in GR1) and the first touch electrode (e.g., TE1 among TE1 to TE25 included in GR1) are connected to different multiplexers (e.g., MUX1 and MUX25), but may be touch electrodes included in an identical sensing group (e.g., GR1).

Accordingly, a touch driving signal TDS supplied to the fourth touch electrode (e.g., TE25 among TE1 to TE25 included in GR1) may have a driving frequency identical to that of a touch driving signal TDS supplied to the first touch electrode (e.g., TE1 among TE1 to TE25 included in GR1).

As described above, in the multiplexer-driving structure, the variable driving-frequency technique, which considers the difference between time constants (or the difference between signal delivery lengths, or the difference between positions) of sensing groups, may also be applied.

Referring to FIG. 14, 10 driving intervals, during which the 10 sensing groups GR1 to GR10 is driven, may correspond to 10 touch driving intervals.

For example, a touch driving signal TDS may be supplied to a first touch electrode (e.g., TE1 to TE25 included in GR1) during a first touch driving interval in which the first sensing group GR1 is driven, and a touch driving signal TDS may be supplied to a second touch electrode (e.g., TE1 to TE25 included in GR10) during a second touch driving interval which is different from the first touch driving interval and in which the tenth sensing group GR10 is driven.

When in the multiplexer-driving structure, the variable driving-frequency technique is not applied which considers the difference between time constants (or the difference between signal delivery lengths, or the difference between positions) of sensing groups, a time length Tb of the second touch driving interval may be identical to a time length Ta of the first touch driving interval (Ta=Tb).

In contrast, when in the multiplexer-driving structure, the variable driving-frequency technique is applied which considers the difference between time constants (or the difference between signal delivery lengths, or the difference between positions) of sensing groups, a time length Tb of the second touch driving interval may be shorter than a time length Ta of the first touch driving interval (Ta>Tb).

When the variable driving-frequency technique, which considers the difference between time constants (or the difference between signal delivery lengths, or the difference between positions) of sensing groups, is applied in the multiplexer-driving structure as described above, the total touch sensing time Tsen can be significantly reduced, thus significantly lengthening the display driving time, thereby performing touch driving and display driving on a high-resolution and large-screen display.

In relation to one touch frame interval, before touch driving signals TDS are supplied to the touch panel TSP, at least one presetting pulse PRE may be supplied to all or some of the touch electrodes TE.

At least one presetting pulse PRE is a signal which is applied to all or some of the touch electrodes TE before touch sensing is fully started (before a touch driving signal TDS is applied), and is used to allow the voltage state of each of the touch electrodes TE to quickly become a voltage state required for touch driving and touch sensing.

An interval, during which one presetting pulse PRE is applied, may be one touch frame interval during which at least one or two presetting pulses PRE exist, or may be at least two touch frame intervals during which at least one or two presetting pulses PRE exist.

With the application of at least one presetting pulse PRE, display-touch crosstalk or a signal delay deviation can be removed or reduced, so as to achieve sensing stabilization.

Although the following configuration is similar to the above-described configuration, a description will be made of an example in which the variable driving-frequency technique, which considers the difference between time constants (or the difference between signal delivery lengths, or the difference between positions) of sensing groups, is applied under a Long Horizontal Blank (LHB) driving scheme in which: one display frame screen is displayed such that the same is divided into screen-division display areas and the screen-division display areas are displayed during multiple display driving intervals; and touch driving is performed in between each pair of display driving intervals.

Figure 15:
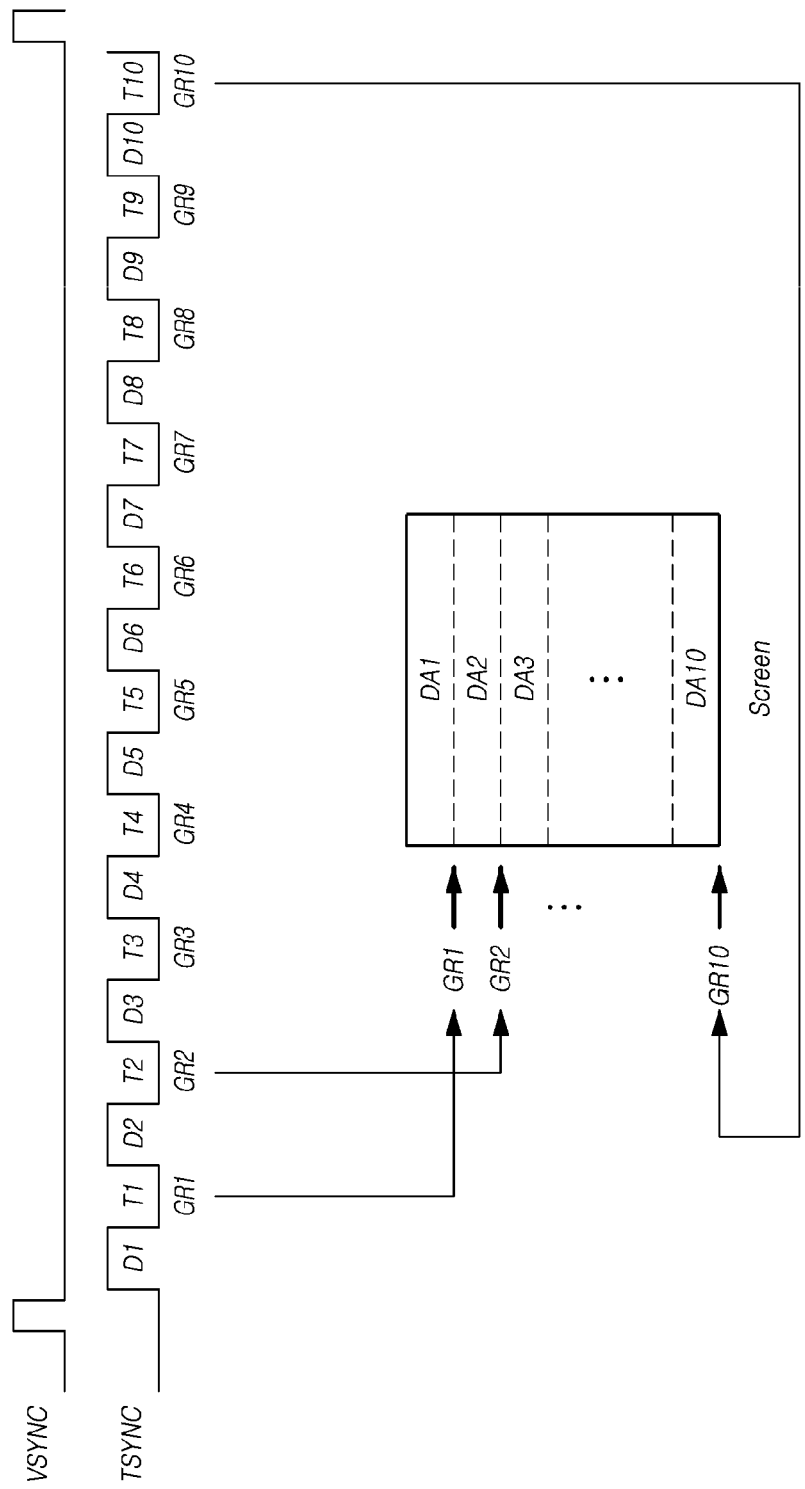
FIG. 15 is a view for explaining time-division driving, in which a touch display device uses a Long Horizontal Blank (LHB), and screen-division display areas depending on the time-division driving according to embodiments of the present disclosure.
Figure 16:
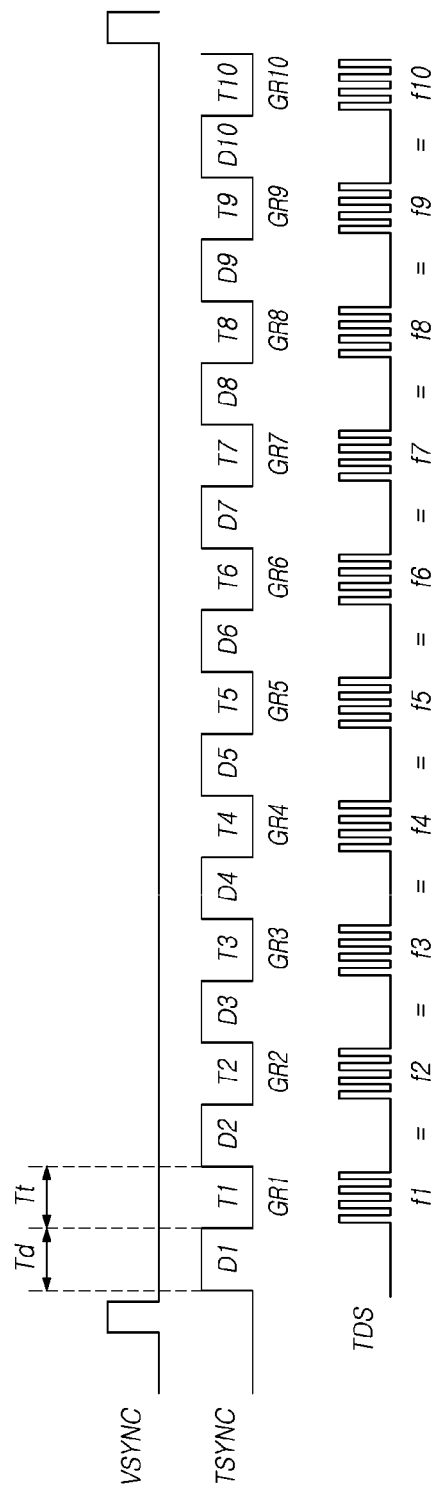
FIG. 16 is a diagram illustrating driving timing to which a variable driving-frequency technique considering the difference between time constants of sensing groups is not applied when a touch display device performs time-division driving that uses an LHB according to embodiments of the present disclosure.
Figure 17A:
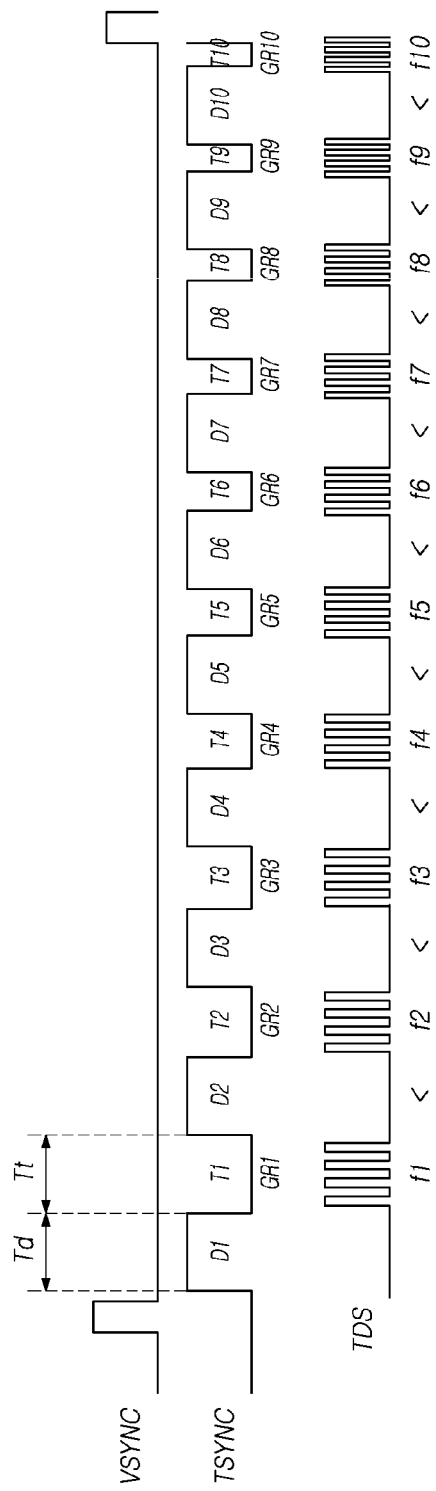
FIG. 17A is a diagram illustrating driving timing to which a variable driving-frequency technique considering the difference between time constants of sensing groups is applied when a touch display device performs time-division driving that uses an LHB according to embodiments of the present disclosure.

FIG. 15 is a view for explaining time-division driving, in which the touch display device 10 uses an LHB, and screen-division display areas depending on the time-division driving according to embodiments of the present disclosure. FIG. 16 is a diagram illustrating driving timing to which a variable driving-frequency technique considering the difference between time constants τ of sensing groups is not applied when the touch display device 10 performs time-division driving that uses an LHB according to embodiments of the present disclosure. FIG. 17A is a diagram illustrating driving timing to which a variable driving-frequency technique considering the difference between time constants τ of sensing groups is applied when the touch display device 10 performs time-division driving that uses an LHB according to embodiments of the present disclosure.

Referring to FIGS. 15 to 17A, for example, the touch display device 10 may divide one display frame screen Screen into 10 screen-division areas DA1 to DA10, and may display the 10 screen-division areas DA1 to DA10 during 10 display driving intervals D1 to D10, respectively.

An LHB interval exists in between each pair of 10 display driving intervals D1 to D10. That is, while one display frame screen Screen is displayed, 10 LHB intervals exist.

The 10 LHB intervals, which exist during the entire interval in which one display frame screen Screen is displayed, may be used as 10 touch driving intervals T1 to T10.

One display frame interval, during which one display frame screen Screen is displayed, may be defined by a vertical synchronizing signal VSYNC.

Also, 10 display driving intervals D1 to D10 and 10 touch driving intervals T1 to T10 in one display frame interval may be defined by a synchronization signal TSYNC.

For example, a low-level interval (or a high-level interval) of a synchronization signal TSYNC may indicate 10 touch driving intervals T1 to T10, and a high-level interval (or a low-level interval) thereof may indicate 10 display driving intervals D1 to D10.

10 touch driving intervals T1 to T10 correspond to driving timing of 10 sensing groups GR1 to GR10 illustrated in FIG. 12.

Referring to FIGS. 16 and 17A, according to the LHB driving scheme, 10 display driving intervals D1 to D10 and 10 touch driving intervals T1 to T10 are alternately included in one display frame interval (e.g., a low-level interval of VSYNC).

10 touch driving intervals T1 to T10 may include: a first touch driving interval (e.g., T1) during which a touch electrode (e.g., a touch electrode included in GR1) having a large time constant is driven; and a second touch driving interval (e.g., T10) during which a touch electrode (e.g., a touch electrode included in GR10) having a small time constant is driven.

Referring to FIG. 16, when in the multiplexer-driving structure, the variable driving-frequency technique is not applied which considers the difference between time constants (or the difference between signal delivery lengths, or the difference between positions) of sensing groups, among 10 display driving intervals D1 to D10, an optional first display driving interval and an optional second display driving interval may both have an identical time length Td.

Also, 10 touch driving intervals T1 to T10 may all have an identical time length Tt.

For example, among 10 touch driving intervals T1 to T10, a first touch driving interval (e.g., T1), during which a touch electrode (e.g., a touch electrode included in GR1) having a large time constant is driven, may have a time length Tt identical to that of a second touch driving interval (e.g., T10) during which a touch electrode (e.g., a touch electrode included in GR10) having a small time constant is driven.

Further, driving frequencies f1 to f10 of respective touch driving signals TDS in 10 touch driving intervals T1 to T10 may be identical to one another (f1=f2= . . . =f10).

For example, a driving frequency (e.g., f1) of a touch driving signal TDS, which is supplied to a touch electrode (e.g., a touch electrode included in GR1) having a large time constant during a first touch driving interval (e.g., T1), may be identical to a driving frequency (e.g., f10) of a touch driving signal TDS supplied to a touch electrode (e.g., a touch electrode included in GR10) having a small time constant during a second touch driving interval (e.g., T10).

Referring to FIG. 17A, when in the multiplexer-driving structure, the variable driving-frequency technique is applied which considers the difference between time constants (or the difference between signal delivery lengths, or the difference between positions) of sensing groups, among 10 display driving intervals D1 to D10 in one display frame interval, a time length Td of an optional first display driving interval may be identical to that of an optional second display driving interval, or the former and the latter may be different according to the circumstances. This configuration will be described below with reference to FIGS. 18 and 19.

However, 10 touch driving intervals T1 to T10 may not all have an identical time length Tt.

For example, respective time lengths Tt of 10 touch driving intervals T1 to T10 may be different, or only time lengths Tt of some thereof may be different.

In this regard, among 10 touch driving intervals T1 to T10, from a relative point of view, a second touch driving interval (e.g., T10), during which a touch electrode (e.g., a touch electrode included in GR10) having a small time constant is driven, may have a time length Tt shorter than that of a first touch driving interval (e.g., T1) during which a touch electrode (e.g., a touch electrode included in GR1) having a large time constant is driven.

Also, driving frequencies f1 to f10 of respective touch driving signals TDS in 10 touch driving intervals T1 to T10 may not all be identical.

For example, respective touch driving signals TDS in 10 touch driving intervals T1 to T10 may have different driving frequencies f1 to f10, or only some of driving frequencies f1 to f10 of respective touch driving signals TDS in 10 touch driving intervals T1 to T10 may be different.

In this regard, a driving frequency (e.g., f10) of a touch driving signal TDS, which is supplied to a touch electrode (e.g., a touch electrode included in GR10) having a small time constant during a second touch driving interval (e.g., T10), may be higher than a driving frequency (e.g., f1) of a touch driving signal TDS which is supplied to a touch electrode (e.g., a touch electrode included in GR1) having a large time constant during a first touch driving interval (e.g., T1).

When the respective time constants of 10 sensing groups GR1 to GR10 are different, driving frequencies f1 to f10 of respective touch driving signals TDS in 10 touch driving intervals T1 to T10 become higher in inverse proportion to the magnitudes of the time constants (i.e., f1<f2< f3< . . . <f10).

Figure 17B:
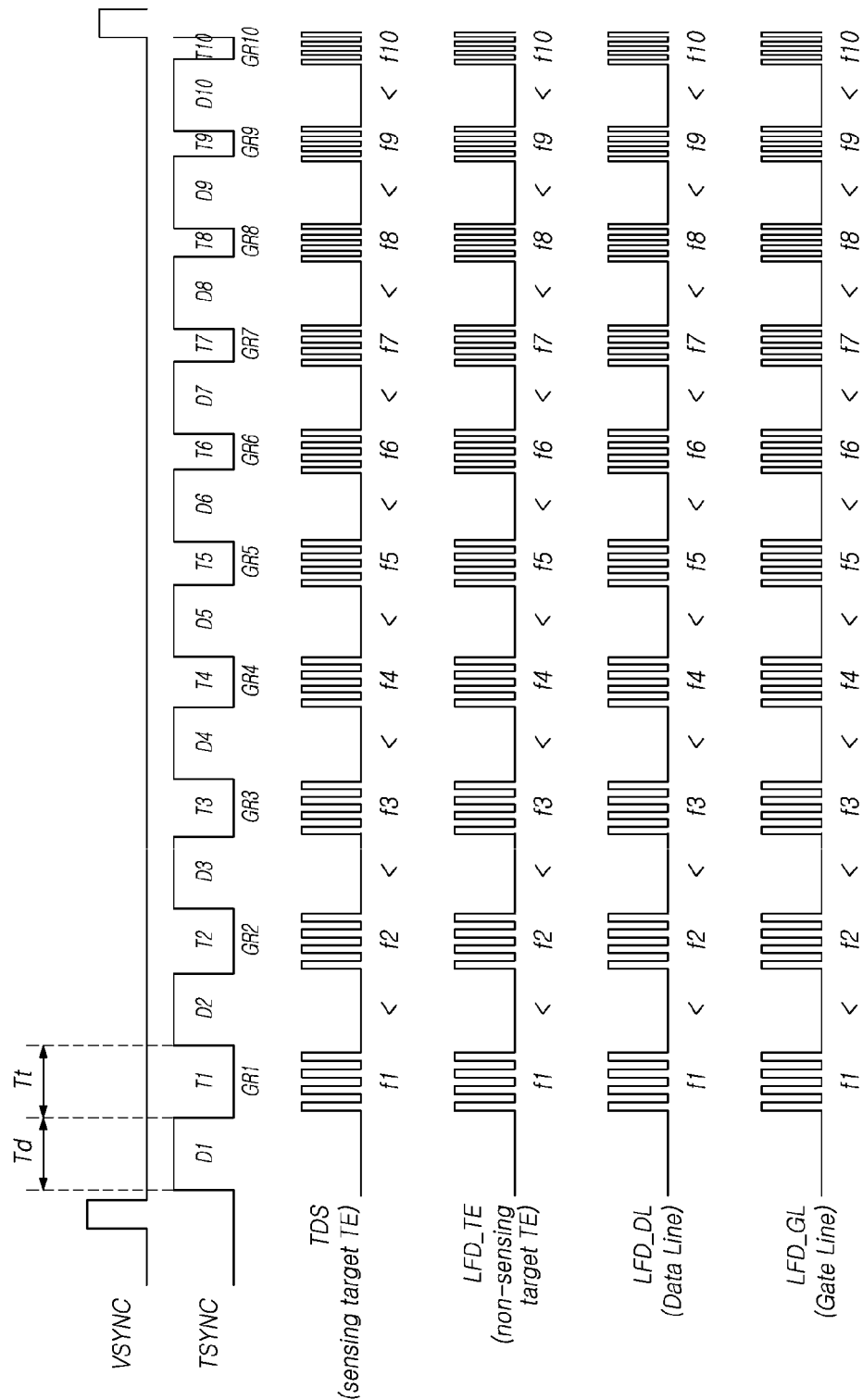
FIG. 17B is a diagram illustrating driving timing to which a variable driving-frequency technique considering the difference between time constants of sensing groups is applied when a touch display device performs, together with load-free driving, time-division driving that uses an LHB according to embodiments of the present disclosure.

FIG. 17B is a diagram illustrating driving timing to which a variable driving-frequency technique considering the difference between time constants of sensing groups is applied when a touch display device performs, together with load-free driving, time-division driving that uses an LHB according to embodiments of the present disclosure.

As described above, during touch driving intervals T1 to T10, LFD may be performed to prevent the occurrence of a parasitic capacitance which may reduce touch sensitivity.

By this configuration, when a touch driving signal TDS is supplied to each of sensing target touch electrodes TE during touch driving intervals T1 to T10, a first LFD signal LFD_TE, which is identical or corresponds to the touch driving signal TDS, may be supplied to each of all or some of non-sensing target touch electrodes TE.

Also, when the touch driving signal TDS is supplied to each of the sensing target touch electrodes TE during touch driving intervals T1 to T10, a second LFD signal LFD_DL, which is identical or corresponds to the touch driving signal TDS, may be supplied to each of all or some of data lines DL.

Further, when the touch driving signal TDS is supplied to each of the sensing target touch electrodes TE during touch driving intervals T1 to T10, a third LFD signal LFD_GL, which is identical or corresponds to the touch driving signal TDS, may be supplied to each of all or some of gate lines GL.

At least one of the above-described first to third LFD signals LFD_TE, LFD_DL, and LFD_GL may be identical or similar to the touch driving signal TDS in terms of frequency and phase, and may be identical or similar to the touch driving signal TDS in terms of amplitude. When at least one of the frequency, phase, and amplitude of the at least one of the LFD signals LFD_TE, LFD_DL, and LFD_GL is similar to at least one of the frequency, phase, and amplitude of the touch driving signal TDS, the difference between the frequencies, phases, or amplitudes, which are similar to each other, may be within a predetermined allowable error range (e.g., 1%, 2%, or 5%).

With the application of a variable driving-frequency technique considering the difference between time constants of sensing groups, driving frequencies f1 to f10 each of the first to third LFD signals LFD_TE, LFD_DL, and LFD_GL may be changed to correspond to changes in driving frequencies f1 to f10 of the touch driving signal TDS.

Figure 18:
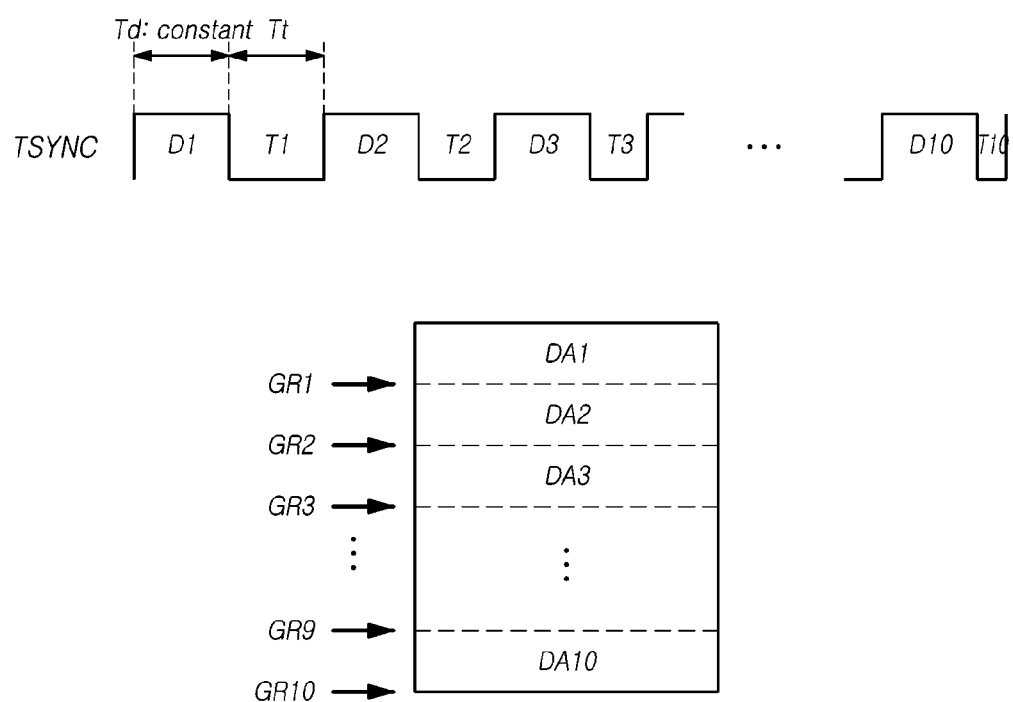
FIG. 18 is a view illustrating an example of a touch driving interval and a display driving interval depending on the application of a variable driving-frequency technique when a touch display device performs time-division driving that uses an LHB according to embodiments of the present disclosure.

FIG. 18 is a view illustrating an example of 10 touch driving intervals T1 to T10 and 10 display driving intervals D1 to D10 depending on the application of a variable driving-frequency technique when the touch display device 10 performs time-division driving that uses an LHB according to embodiments of the present disclosure.

When the variable driving-frequency technique is applied, 10 touch driving intervals T1 to T10 become longer in proportion to the magnitudes of time constants. Among 10 touch driving intervals T1 to T10, a touch driving interval, during which a touch electrode having a smaller time constant is driven, may have a shorter time length Tt (T1→T2→ . . . →T10).

However, time lengths Td of 10 display driving intervals D1 to D10 may all have a constant time length. That is, among 10 display driving intervals D1 to D10, an optional first display driving interval D may have a time length identical to that of an optional second display driving interval D.

By this configuration, display driving can be more easily controlled. Also, according to the LHB driving scheme, 10 screen-division areas DA1 to DA10, into which one display frame screen Screen is divided and which are respectively displayed during 10 display driving intervals D1 to D10 on one display frame screen Screen, may all have an identical size.

Figure 19:
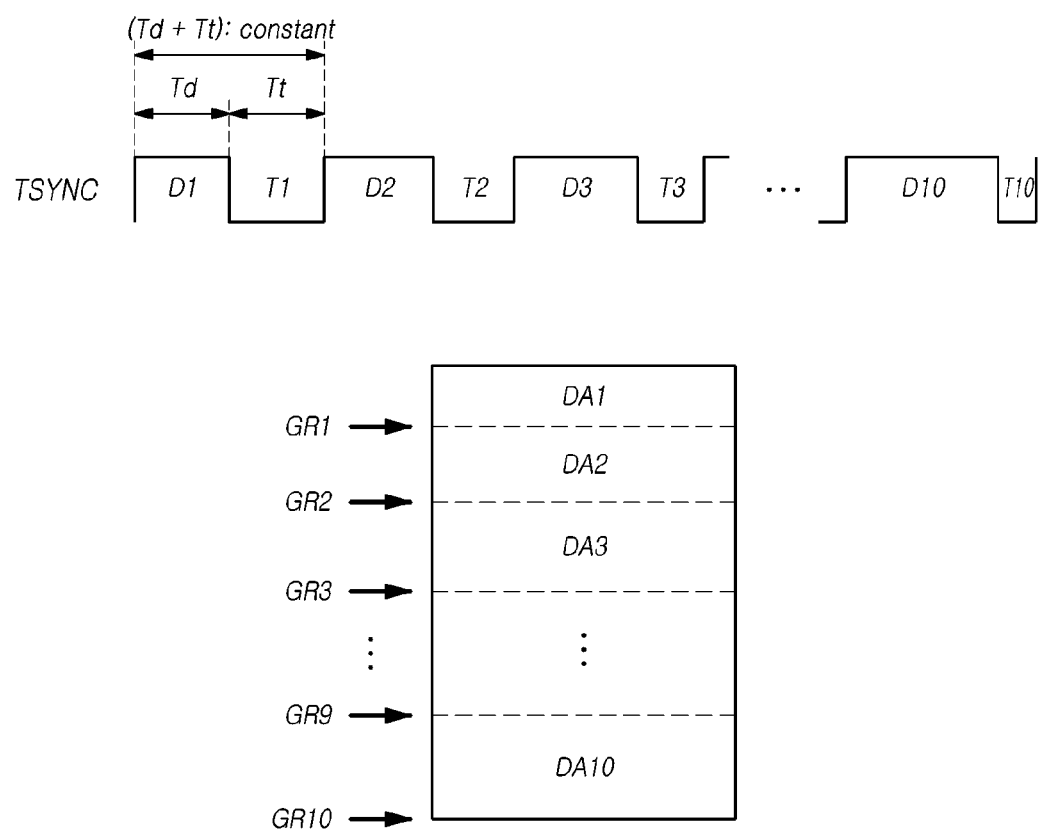
FIG. 19 is a view illustrating another example of a touch driving interval and a display driving interval depending on the application of a variable driving-frequency technique when a touch display device performs time-division driving that uses an LHB according to embodiments of the present disclosure.

FIG. 19 is a view illustrating another example of 10 touch driving intervals T1 to T10 and 10 display driving intervals D1 to D10 depending on the application of a variable driving-frequency technique when the touch display device 10 performs time-division driving that uses an LHB according to embodiments of the present disclosure.

When the variable driving-frequency technique is applied, 10 touch driving intervals T1 to T10 become longer in proportion to the magnitudes of time constants. Among 10 touch driving intervals T1 to T10, a touch driving interval, during which a touch electrode having a smaller time constant is driven, may have a shorter time length Tt (T1→T2→ . . . →T10).

As described above, the time length Td of the corresponding display driving interval may be lengthened by the decrement of the time length Tt of a touch driving interval. That is, among 10 display driving intervals D1 to D10, the time length Td of a second display driving interval (e.g., D10) corresponding to a second touch driving interval (e.g., T10) having a short time length Tt may be longer than time length Td of a first display driving interval (e.g., D1) corresponding to a first touch driving interval (e.g., T1) having a long time length Tt.

In the present example, the sum (Td+Tt) of the time lengths of a display driving interval and a touch driving interval, which correspond to each other, may have a constant time length.

For example, the sum (Td+Tt) of a time length Tt of a first touch driving interval (e.g., T1), during which a touch electrode (e.g., a touch electrode included in GR1) having a large time constant is driven, and time length Td of a first display driving interval (e.g., D1) may be identical to the sum (Td+Tt) of a time length Tt of a second touch driving interval (e.g., T10), during which a touch electrode (e.g., a touch electrode included in GR10) having a small time constant is driven, and a time length Td of a second display driving interval (e.g., D1).

According to this configuration, a display driving time may be lengthened by the decrement of a touch sensing time. In the present example, according to the LHB driving scheme, each of sizes of 10 screen-division areas DA1 to DA10, into which one display frame screen Screen is divided and which are respectively displayed during 10 display driving intervals D1 to D10 on one display frame screen Screen, may be changed to correspond to the time length Td of a display driving interval.

Figure 20:
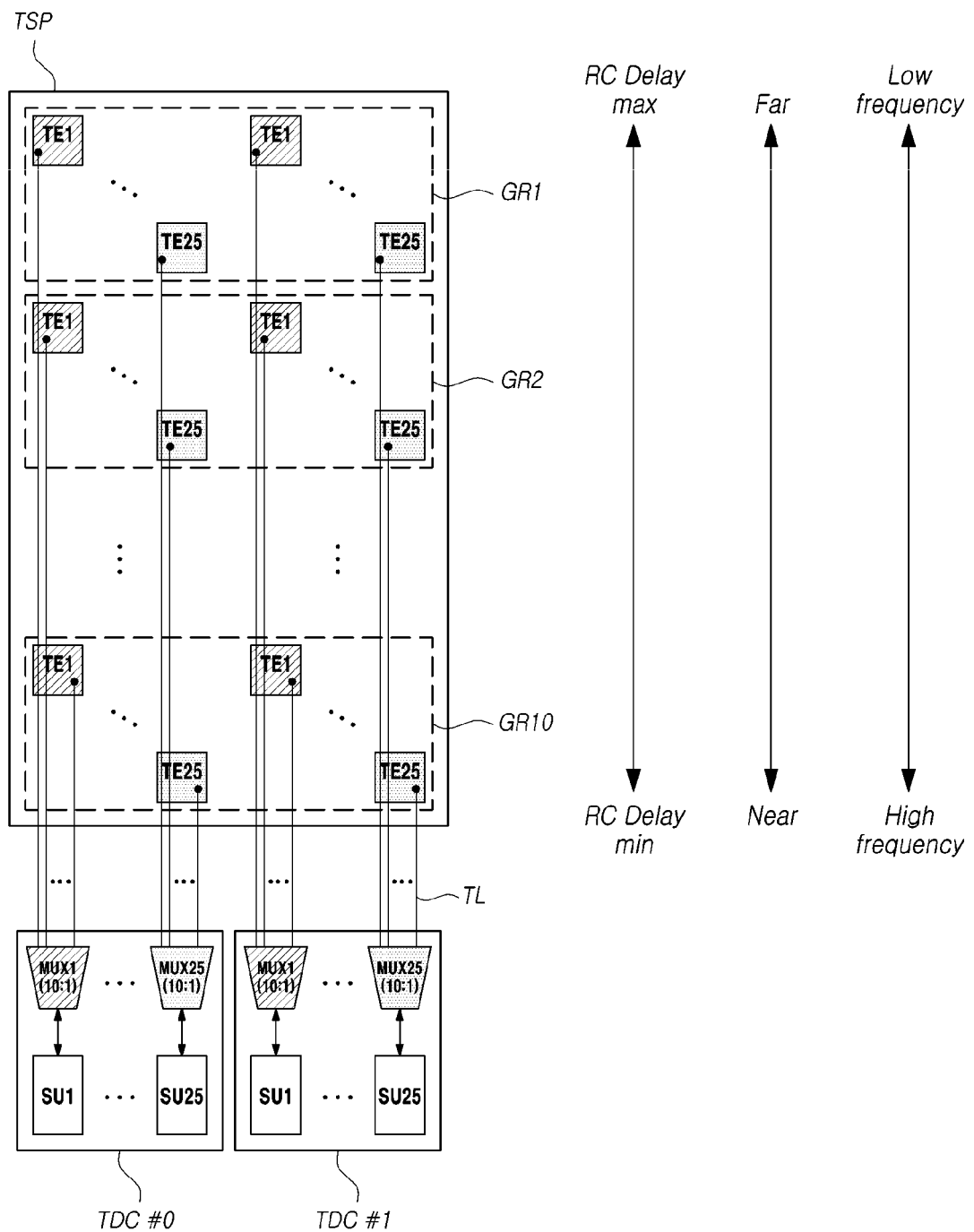
FIG. 20 is a view illustrating a case where a touch display device drives a touch panel by using two touch driving circuits according to embodiments of the present disclosure.

FIG. 20 is a view illustrating a case where the touch display device 10 drives the touch panel TSP by using two touch driving circuits TDC according to embodiments of the present disclosure.

As illustrated in FIG. 20, the touch display device 10 may drive the touch panel TSP having a size, which is much larger than that of the touch panel TSP illustrated in FIG. 12, by using at least two touch driving circuits TDC #0 and TDC #1.

When the large touch panel TSP is driven, touch driving may be performed using a touch electrode-specific or sensing group-specific variable driving-frequency technique considering the difference between time constants, so that the touch sensing time can be significantly reduced and the display driving time can be lengthened by the decrement of the touch sensing time.

Figure 21:
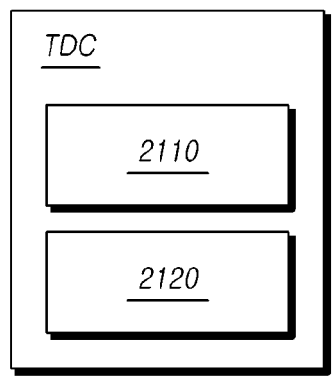
FIG. 21 is a block diagram illustrating a schematic configuration of a touch driving circuit according to embodiments of the present disclosure.

FIG. 21 is a block diagram illustrating a schematic configuration of the touch driving circuit TDC according to embodiments of the present disclosure.

Referring to FIG. 21, the touch driving circuit TDC according to embodiments of the present disclosure may include a signal supplier 2110 configured to supply a touch driving signal TDS to at least one of multiple touch electrodes TE, a signal receiver 2120 configured to receive a touch sensing signal according to the supply of the touch driving signal TDS, and the like.

As compared with the configuration of the touch driving circuit TDC illustrated in FIG. 5, the signal supplier 2110 may include the first multiplexer circuit MXC1, the pre-amplifier Pre-AMP of each sensing unit SU, and the like. The signal receiver 2120 may include the first multiplexer circuit MXC1, the pre-amplifier Pre-AMP of each sensing unit SU, the integrator INTG thereof, the sample-and-hold circuit SHA thereof, and the like.

The multiple touch electrodes TE may include a first touch electrode and a second touch electrode.

When the second touch electrode has a time constant τ smaller than that of the first touch electrode, a touch driving signal TDS supplied to the second touch electrode may have a driving frequency higher than that of a touch driving signal TDS supplied to the first touch electrode.

When the above-described touch driving circuit TDC is used, touch driving may be performed using a touch electrode-specific or sensing group-specific variable driving-frequency technique considering a time constant, so that a touch sensing time Tsen can be reduced.

Figure 22:
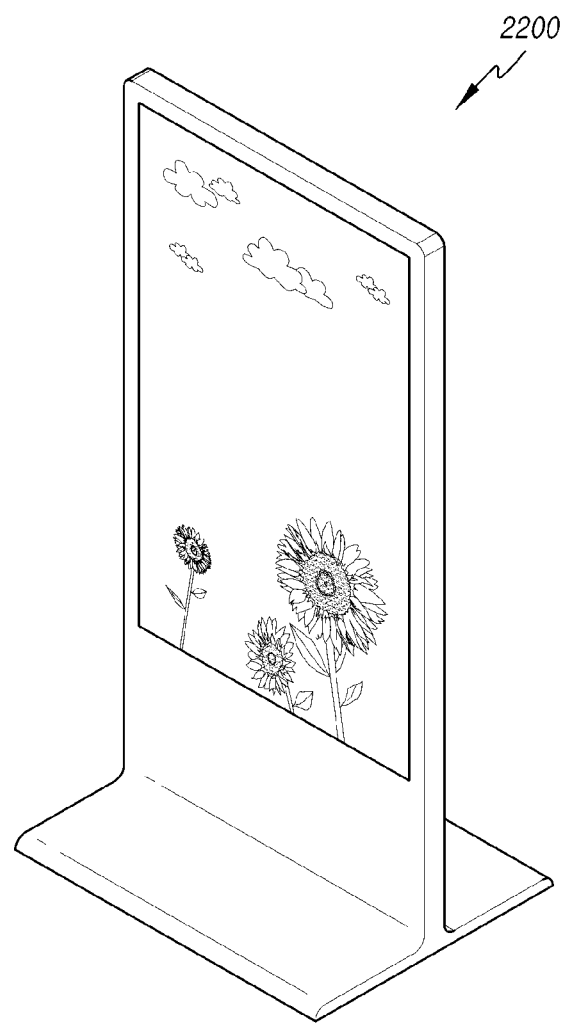
FIG. 22 is a view illustrating a kiosk as an example of implementation of a touch display device according to embodiments of the present disclosure.

FIG. 22 is a view illustrating a kiosk as an example of implementation of the touch display device 10 according to embodiments of the present disclosure.

Regardless of whether the touch driving method according to embodiments of the present disclosure is applied to a small display, medium and large displays, or the like, wherein the touch driving method uses the variable signal characteristic technique, such as the variable driving-frequency technique considering the difference between time constants (or the difference between signal delivery lengths, or the difference between positions) of touch electrodes or sensing groups, the same can significantly reduce a touch sensing time.

The touch display device 10 according to embodiments of the present disclosure may be a large display that requires a large screen and/or high resolution, and may be, for example, a kiosk, a large screen, and the like.

A large display that requires a large screen and/or high resolution needs such a long display driving time that a small- or medium-sized display cannot be compared with the same.

However, since a large display has a large touch panel TSP mounted therewithin or mounted on the outside thereof as illustrated in FIG. 20, the same has a significantly large number of touch electrodes, and thus inevitably has quite a long touch sensing time. As a result, it is very difficult to provide the large display with a longer display driving time.

However, when the touch driving method according to embodiments of the present disclosure is applied to a large display that requires a large screen and/or high resolution, wherein the touch driving method uses the variable signal characteristic technique, such as the variable driving-frequency technique considering the difference between time constants (or the difference between signal delivery lengths, or the difference between positions) of touch electrodes or sensing groups, a touch sensing time can be significantly reduced, so that a display driving time can be significantly lengthened.

The above-described touch driving method according to embodiments of the present disclosure will be briefly described again with reference to FIG. 23.

Figure 23:
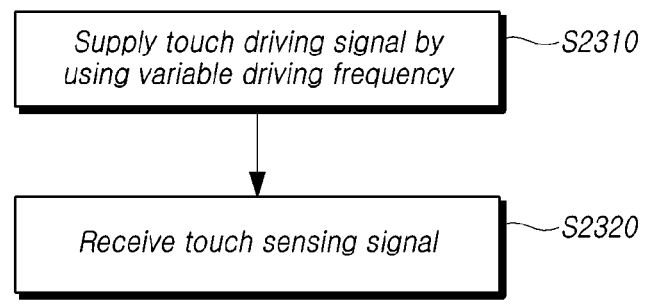
FIG. 23 is a flowchart schematically illustrating a touch driving method according to embodiments of the present disclosure.

FIG. 23 is a flowchart schematically illustrating a touch driving method according to embodiments of the present disclosure.

Referring to FIG. 23, the touch driving method according to embodiments of the present disclosure may include: a step (S2310) of supplying a touch driving signal TDS to at least one of multiple touch electrodes TE; and a step (S2320) of, upon supplying the touch driving signal TDS, receiving a touch sensing signal, and the like.

The multiple touch electrodes TE may include a first touch electrode and a second touch electrode.

When the second touch electrode has a time constant τ smaller than that of the first touch electrode, the driving frequency of a touch driving signal TDS supplied to the second touch electrode may be higher than that of a touch driving signal TDS supplied to the first touch electrode.

When the above-described touch driving method is used, touch driving may be performed using the touch electrode-specific variable driving-frequency technique considering the difference between time constants, so that a touch sensing time Tsen can be reduced.

Hereinabove, the above-described embodiments of the present disclosure provide the touch display device 10, the touch driving circuit TDC, and the touch driving method which, without reducing touch sensitivity, can reduce the touch sensing time required to sense all touch electrodes.

Also, the above-described embodiments of the present disclosure provide the touch display device 10, the touch driving circuit TDC, and the touch driving method which, without reducing touch sensitivity, can perform touch driving in a scheme capable of significantly lengthening the display driving time.

Also, the above-described embodiments of the present disclosure provide the touch display device 10, the touch driving circuit TDC, and the touch driving method which can perform touch driving in a scheme which can be applied to a display requiring a large screen and high resolution.

Also, the above-described embodiments of the present disclosure provide the touch display device 10, the touch driving circuit TDC, and the touch driving method which can perform touch driving in such a manner as to cause touch driving signals to have different signal characteristics by considering the difference between time constants of touch electrodes or sensing groups (groups of touch electrodes capable of being simultaneously sensed).

Also, the above-described embodiments of the present disclosure provide the touch display device 10, the touch driving circuit TDC, and the touch driving method which can perform touch driving in such a manner as to cause touch driving signals to have different signal characteristics by considering the difference between signal delivery lengths of touch electrodes or sensing groups (groups of touch electrodes capable of being simultaneously sensed).

Further, the above-described embodiments of the present disclosure provide the touch display device 10, the touch driving circuit TDC, and the touch driving method which can perform touch driving in such a manner as to cause touch driving signals to have different signal characteristics by considering the difference between positions of touch electrodes or sensing groups (groups of touch electrodes capable of being simultaneously sensed).

The above description and the accompanying drawings are merely provided as an example of the technical idea of the present disclosure, and those having ordinary knowledge in the technical field to which the present disclosure pertains will appreciate that various modifications and changes in form, such as combination, separation, substitution, and change of a configuration, may be made to the embodiments described herein without departing from the essential features of the present disclosure. Therefore, the embodiments disclosed in the present disclosure are intended not to limit but to describe the technical idea of the present disclosure, and thus do not limit the scope of the technical idea of the present disclosure. The scope of the present disclosure should be construed based on the appended claims, and all of the technical ideas included within the scope equivalent to the appended claims should be construed as being included within the scope of the present disclosure.

What is claimed is:

1. A touch display device comprising:
   a touch panel having multiple touch electrodes; and
   a touch driving circuit configured to supply a touch driving signal to at least one of the multiple touch electrodes,
   wherein the multiple touch electrodes comprise a first touch electrode, a second touch electrode, and a third touch electrode,
   wherein the first touch electrode and the second touch electrode are included in a first group and the third touch electrode is included in a second group different from the first group,
   wherein the first touch electrode the second touch electrode, and the third touch electrode are configured as at least one of:
   a) a time constant of the second touch electrode is smaller than a time constant of the first touch electrode, and the time constant of the second touch electrode is bigger than a time constant of the third touch electrode,
   b) the second touch electrode is located nearer to the touch driving circuit than the first touch electrode, and the third touch electrode is located nearer to the touch driving circuit than the second touch electrode, and
   c) a touch driving signal supplied to the second touch electrode has a signal delivery length shorter than a signal delivery length of a touch driving signal supplied to the first touch electrode, and a touch driving signal supplied to the third touch electrode has a signal delivery length shorter than the signal delivery length of the touch driving signal supplied to the second touch electrode,
   wherein a driving frequency of the touch driving signal supplied to the second touch electrode is same as a driving frequency of the touch driving signal supplied to the first touch electrode, and a driving frequency of the touch driving signal supplied to the third touch electrode is higher than the driving frequency of the touch driving signal supplied to the first touch electrode,
   wherein the first touch electrode and the third touch electrode are electrically connected to a first multiplexer and the second touch electrode is electrically connected to a second multiplexer different from the first multiplexer, and
   wherein the first multiplexer is configured to output a number of touch driving signals having at least two frequencies and the second multiplexer is configured to output a number of touch driving signals having at least two frequencies.

2. The touch display device of claim 1, comprising:
   a first touch line configured to connect the touch driving circuit to the first touch electrode; and
   a second touch line configured to connect the touch driving circuit to the second touch electrode,
   wherein the time constant of the first touch electrode corresponds to an RC delay of the touch driving circuit, the first touch line, and the first touch electrode, and
   wherein the time constant of the second touch electrode corresponds to the RC delay of the touch driving circuit, the second touch line, and the second touch electrode.

3. The touch display device of claim 1, wherein a number of pulses of the touch driving signal supplied to the first touch electrode is identical to a number of pulses of the touch driving signal supplied to the second touch electrode.

4. The touch display device of claim 1, wherein the first multiplexer and the second multiplexer are included in the touch driving circuit.

5. The touch display device of claim 1, wherein the touch driving signal supplied to the first touch electrode is supplied during a first touch driving interval,
   wherein the touch driving signal supplied to the third touch electrode is supplied during a second touch driving interval different from the first touch driving interval, and
   wherein a time length of the second touch driving interval is shorter than a time length of the first touch driving interval.

6. The touch display device of claim 5, wherein a first display driving interval exists before the first touch driving interval, and a second display driving interval exists between the first touch driving interval and the second touch driving interval, or
   the first display driving interval exists between the first touch driving interval and the second touch driving interval, and the second display driving interval exists after the second touch driving interval, and
   wherein a time length of the first display driving interval is identical to a time length of the second display driving interval.

7. The touch display device of claim 5, wherein a first display driving interval exists before the first touch driving interval, and a second display driving interval exists between the first touch driving interval and the second touch driving interval, or
   the first display driving interval exists between the first touch driving interval and the second touch driving interval, and the second display driving interval exists after the second touch driving interval, and
   wherein a time length of the second display driving interval is different from a time length of the first display driving interval.

8. The touch display device of claim 7, wherein a sum of the time length of the first touch driving interval and the time length of the first display driving interval is identical to a sum of the time length of the second touch driving interval and the time length of the second display driving interval.

9. The touch display device of claim 1, wherein the touch display device comprises a kiosk.

10. A touch driving circuit for driving a touch panel having multiple touch electrodes, the touch driving circuit comprising:
- a signal supplier configured to supply a touch driving signal to at least one of the multiple touch electrodes,
- wherein the multiple touch electrodes comprise a first touch electrode, a second touch electrode, and a third touch electrode,
- wherein the first touch electrode and the second touch electrode are included in a first group and the third touch electrode is included in a second group different from the first group,
- wherein the first touch electrode the second touch electrode, and the third touch electrode are configured as at least one of:
  a) a time constant of the second touch electrode is smaller than a time constant of the first touch electrode, and the time constant of the second touch electrode is bigger than a time constant of the third touch electrode,
  b) the second touch electrode is located nearer to the touch driving circuit than the first touch electrode, and the third touch electrode is located nearer to the touch driving circuit than the second touch electrode, and
  c) a touch driving signal supplied to the second touch electrode has a signal delivery length shorter than a signal delivery length of a touch driving signal supplied to the first touch electrode, and a touch driving signal supplied to the third touch electrode has a signal delivery length shorter than the signal delivery length of the touch driving signal supplied to the second touch electrode,
- wherein a driving frequency of the touch driving signal supplied to the second touch electrode is same as a driving frequency of the touch driving signal supplied to the first touch electrode, and a driving frequency of the touch driving signal supplied to the third touch electrode is higher than the driving frequency of the touch driving signal supplied to the first touch electrode,
- wherein the first touch electrode and the third touch electrode are electrically connected to a first multiplexer and the second touch electrode is electrically connected to a second multiplexer different from the first multiplexer, and
- wherein the first multiplexer is configured to output a number of touch driving signals having at least two frequencies and the second multiplexer is configured to output a number of touch driving signals having at least two frequencies.

11. A touch driving method for driving a touch panel having multiple touch electrodes, the method comprising:
- supplying a touch driving signal to at least one of the multiple touch electrodes,
  - wherein the multiple touch electrodes comprise a first touch electrode, a second touch electrode, and a third touch electrode,
  - wherein the first touch electrode and the second touch electrode are included in a first group and the third touch electrode is included in a second group different from the first group,
  - wherein the first touch electrode the second touch electrode, and the third touch electrode are configured as at least one of:
    a) a time constant of the second touch electrode is smaller than a time constant of the first touch electrode, and the time constant of the second touch electrode is bigger than a time constant of the third touch electrode,
    b) the second touch electrode is located nearer to the touch driving circuit than the first touch electrode, and the third touch electrode is located nearer to the touch driving circuit than the second touch electrode, and
    c) a touch driving signal supplied to the second touch electrode has a signal delivery length shorter than a signal delivery length of a touch driving signal supplied to the first touch electrode, and a touch driving signal supplied to the third touch electrode has a signal delivery length shorter than the signal delivery length of the touch driving signal supplied to the second touch electrode,
  - wherein a driving frequency of the touch driving signal supplied to the second touch electrode is same as a driving frequency of the touch driving signal supplied to the first touch electrode, and a driving frequency of the touch driving signal supplied to the third touch electrode is higher than the driving frequency of the touch driving signal supplied to the first touch electrode,
  - wherein the first touch electrode and the third touch electrode are electrically connected to a first multiplexer and the second touch electrode is electrically connected to a second multiplexer different from the first multiplexer, and
  - wherein the first multiplexer is configured to output a number of touch driving signals having at least two frequencies and the second multiplexer is configured to output a number of touch driving signals having at least two frequencies.

* * * * *